United States Patent
Cheng et al.

(10) Patent No.: US 10,004,063 B2
(45) Date of Patent: Jun. 19, 2018

(54) PDSCH TRANSMISSION METHOD AND APPARATUS

(71) Applicant: Huawei Technologies Co., Ltd., Shenzhen (CN)

(72) Inventors: Yan Cheng, Beijing (CN); David Jean-Marie Mazzarese, Beijing (CN); Lixia Xue, Beijing (CN); Yongxing Zhou, Beijing (CN); Brian Classon, Palatine, IL (US)

(73) Assignee: Huawei Technologies Co., Ltd., Shenzhen (CN)

( * ) Notice: Subject to any disclaimer, the term of this patent is extended or adjusted under 35 U.S.C. 154(b) by 252 days.

(21) Appl. No.: 14/802,938

(22) Filed: Jul. 17, 2015

(65) Prior Publication Data
US 2015/0327226 A1  Nov. 12, 2015

Related U.S. Application Data

(63) Continuation of application No. PCT/CN2013/070740, filed on Jan. 18, 2013.

(51) Int. Cl.
*H04W 4/00* (2018.01)
*H04B 7/216* (2006.01)
(Continued)

(52) U.S. Cl.
CPC ......... *H04W 72/042* (2013.01); *H04L 5/0044* (2013.01); *H04L 5/0094* (2013.01);
(Continued)

(58) Field of Classification Search
CPC .............. H04W 48/08; H04W 72/0453; H04L 5/0053; H04L 5/0044
See application file for complete search history.

(56) References Cited

U.S. PATENT DOCUMENTS

| 2012/0207103 A1* | 8/2012 | Dai ................. H04W 48/08 370/329 |
| 2013/0064165 A1* | 3/2013 | Chen ............... H04W 56/0045 370/312 |

(Continued)

FOREIGN PATENT DOCUMENTS

| CN | 101714892 A | 5/2010 |
| CN | 101789823 A | 7/2010 |

(Continued)

OTHER PUBLICATIONS

"Spatial diversity for localized and distributed ePDCCH," 3GPP TSG RAN WG1 Meeting #70, Qingdao, China, R1-123558, 3$^{rd}$ Generation Partnership Project, Valbonne, France (Aug. 13-17, 2012).

(Continued)

*Primary Examiner* — Melanie Jagannathan
(74) *Attorney, Agent, or Firm* — Leydig, Voit & Mayer, Ltd.

(57) ABSTRACT

Embodiments of the present invention provide a PDSCH transmission method and apparatus. The method includes: detecting a downlink control channel for scheduling a PDSCH; determining a resource allocation scheme of the PDSCH according to a DCI format of the downlink control channel for scheduling the PDSCH and an attribute of a carrier for carrying the PDSCH; and decoding the PDSCH according to the resource allocation scheme of the PDSCH and a transmission scheme of the PDSCH. The embodiments of the present invention provide an effective solution to PDSCH transmission.

7 Claims, 6 Drawing Sheets

(51) Int. Cl.
H04W 72/04 (2009.01)
H04W 74/08 (2009.01)
H04W 72/12 (2009.01)
H04L 5/00 (2006.01)

(52) U.S. Cl.
CPC ....... *H04W 72/1289* (2013.01); *H04W 74/08* (2013.01); *H04L 5/0048* (2013.01); *H04W 72/04* (2013.01); *H04W 72/0453* (2013.01)

(56) References Cited

U.S. PATENT DOCUMENTS

| | | | |
|---|---|---|---|
| 2013/0176952 A1* | 7/2013 | Shin | H04L 5/001 370/329 |
| 2014/0105162 A1 | 4/2014 | Li et al. | |
| 2014/0133429 A1* | 5/2014 | Chun | H04L 5/005 370/329 |
| 2014/0153515 A1* | 6/2014 | Chun | H04L 5/0007 370/329 |

FOREIGN PATENT DOCUMENTS

| | | |
|---|---|---|
| CN | 102325382 A | 1/2012 |
| CN | 102843209 A | 12/2012 |
| EP | 2717502 A1 | 4/2014 |
| WO | WO 2010124721 A1 | 11/2010 |
| WO | WO 2012175057 A1 | 12/2012 |

OTHER PUBLICATIONS

"Discussion on transmission modes on NCT," 3GPP TSG RAN WG1 Meeting #71, New Orleans, Louisiana, R1-124944, 3$^{rd}$ Generation Partnership Project, Valbonne, France (Nov. 12-16, 2012).

\* cited by examiner

PDSCH TRANSMISSION METHOD AND APPARATUS

CROSS-REFERENCE TO RELATED APPLICATIONS

This application is a continuation of International Patent Application No. PCT/CN2013/070740, filed on Jan. 18, 2013, which is hereby incorporated by reference in its entirety.

TECHNICAL FIELD

Embodiments of the present invention relate to communications technologies, and in particular, to a PDSCH transmission method and apparatus.

BACKGROUND

In a Long Term Evolution (LTE) system, a eNodeB needs to determine a corresponding resource allocation scheme and transmission scheme before transmitting a physical downlink shared channel (PDSCH); and a user equipment (UE) needs to determine the corresponding resource allocation scheme and transmission scheme before the UE can decode the PDSCH.

In a process of implementing the present invention, the inventors find that the prior art does not provide an effective solution to PDSCH transmission.

SUMMARY

Embodiments of the present invention provide a PDSCH transmission method and apparatus to provide an effective solution to PDSCH transmission.

According to a first aspect, an embodiment of the present invention provides a PDSCH transmission method, including:

detecting a downlink control channel for scheduling a physical downlink shared channel PDSCH;

determining a resource allocation scheme of the PDSCH according to a downlink control information DCI format of the downlink control channel for scheduling the PDSCH and an attribute of a carrier for carrying the PDSCH; and decoding the PDSCH according to the resource allocation scheme of the PDSCH and a transmission scheme of the PDSCH.

According to a second aspect, an embodiment of the present invention provides a PDSCH transmission method, including:

detecting a downlink control channel for scheduling a physical downlink shared channel PDSCH;

determining a transmission scheme of the PDSCH according to an attribute of a carrier for carrying the PDSCH; and decoding the PDSCH according to the transmission scheme of the PDSCH and a resource allocation scheme of the PDSCH.

According to a third aspect, an embodiment of the present invention provides a PDSCH transmission method, including:

determining a resource allocation scheme of a PDSCH according to a downlink control information DCI format of a downlink control channel for scheduling the PDSCH and an attribute of a carrier for carrying the PDSCH;

determining, according to the resource allocation scheme of the PDSCH, DCI carried on the downlink control channel, and transmitting, on the downlink control channel, the DCI carried on the downlink control channel; and transmitting, in a physical resource block PRB indicated by the DCI carried on the downlink control channel, the PDSCH according to a transmission scheme of the PDSCH.

According to a fourth aspect, an embodiment of the present invention provides a PDSCH transmission method, including:

determining a transmission scheme of a PDSCH according to an attribute of a carrier for carrying the PDSCH; and transmitting, in a physical resource block PRB indicated by downlink control information DCI on a downlink control channel for scheduling the PDSCH, the PDSCH according to the transmission scheme of the PDSCH.

According to a fifth aspect, an embodiment of the present invention provides a PDSCH transmission apparatus, including:

a detecting module, configured to detect a downlink control channel for scheduling a physical downlink shared channel PDSCH;

a resource determining module, configured to determine a resource allocation scheme of the PDSCH according to a downlink control information DCI format of the downlink control channel for scheduling the PDSCH and an attribute of a carrier for carrying the PDSCH; and a decoding module, configured to decode the PDSCH according to the resource allocation scheme of the PDSCH and a transmission scheme of the PDSCH.

According to a sixth aspect, an embodiment of the present invention provides a PDSCH transmission apparatus, including:

a detecting module, configured to detect a downlink control channel for scheduling a physical downlink shared channel PDSCH;

a transmission determining module, configured to determine a transmission scheme of the PDSCH according to an attribute of a carrier for carrying the PDSCH; and a decoding module, configured to decode the PDSCH according to the transmission scheme of the PDSCH and a resource allocation scheme of the PDSCH.

According to a seventh aspect, an embodiment of the present invention provides a PDSCH transmission apparatus, including:

a resource determining module, configured to determine a resource allocation scheme of a PDSCH according to a downlink control information DCI format of a downlink control channel for scheduling the PDSCH and an attribute of a carrier for carrying the PDSCH;

a first transmitting module, configured to determine, according to the resource allocation scheme of the PDSCH, DCI carried on the downlink control channel, and transmit, on the downlink control channel, the DCI carried on the downlink control channel; and a second transmitting module, configured to transmit, in a physical resource block PRB indicated by the DCI carried on the downlink control channel, the PDSCH according to a transmission scheme of the PDSCH.

According to an eighth aspect, an embodiment of the present invention provides a PDSCH transmission apparatus, including:

a transmission determining module, configured to determine a transmission scheme of a PDSCH according to an attribute of a carrier for carrying the PDSCH; and a transmitting module, configured to transmit, in a physical resource block PRB indicated by downlink control information DCI on a downlink control channel for scheduling the PDSCH, the PDSCH according to the transmission scheme of the PDSCH.

According to a ninth aspect, an embodiment of the present invention provides a PDSCH transmission apparatus, including:

a detecting module, configured to detect a downlink control channel for scheduling a physical downlink shared channel PDSCH;

a resource determining module, configured to determine a resource allocation scheme of the PDSCH according to a downlink control information DCI format of the downlink control channel for scheduling the PDSCH and an attribute of a carrier for carrying the PDSCH; and a decoding module, configured to decode the PDSCH according to the resource allocation scheme of the PDSCH and a transmission scheme of the PDSCH.

According to a tenth aspect, an embodiment of the present invention provides a PDSCH transmission apparatus, including:

a detecting module, configured to detect a downlink control channel for scheduling a physical downlink shared channel PDSCH;

a transmission determining module, configured to determine a transmission scheme of the PDSCH according to an attribute of a carrier for carrying the PDSCH; and a decoding module, configured to decode the PDSCH according to the transmission scheme of the PDSCH and a resource allocation scheme of the PDSCH.

According to an eleventh aspect, an embodiment of the present invention provides a PDSCH transmission apparatus, including:

a resource determining module, configured to determine a resource allocation scheme of a PDSCH according to a downlink control information DCI format of a downlink control channel for scheduling the PDSCH and an attribute of a carrier for carrying the PDSCH;

a first transmitting module, configured to determine, according to the resource allocation scheme of the PDSCH, DCI carried on the downlink control channel, and transmit, on the downlink control channel, the DCI carried on the downlink control channel; and a second transmitting module, configured to transmit, in a physical resource block PRB indicated by the DCI carried on the downlink control channel, the PDSCH according to a transmission scheme of the PDSCH.

According to a twelfth aspect, an embodiment of the present invention provides a PDSCH transmission apparatus, including:

a transmission determining module, configured to determine a transmission scheme of a PDSCH according to an attribute of a carrier for carrying the PDSCH; and a transmitting module, configured to transmit, in a physical resource block PRB indicated by downlink control information DCI on a downlink control channel for scheduling the PDSCH, the PDSCH according to the transmission scheme of the PDSCH.

At least one of the foregoing multiple technical solutions has the following beneficial effects:

In the embodiments of the present invention, a downlink control channel for scheduling a PDSCH is detected; a resource allocation scheme of the PDSCH is determined according to a downlink control information DCI format of the downlink control channel for scheduling the PDSCH and an attribute of a carrier for carrying the PDSCH; and the PDSCH is decoded according to the resource allocation scheme of the PDSCH and a transmission scheme of the PDSCH. Thereby an effective solution to PDSCH transmission is provided.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
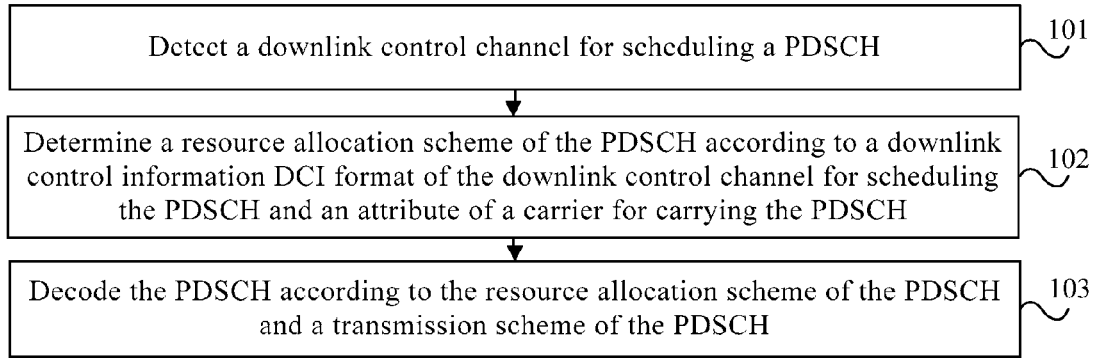
FIG. 1 is a schematic flowchart of a PDSCH transmission method according to Embodiment 1 of the present invention.

FIG. 1 is a schematic flowchart of a PDSCH transmission method according to Embodiment 1 of the present invention. As shown in FIG. 1, the method includes:

101. Detect a downlink control channel for scheduling a PDSCH.

For example, a UE detects a downlink control channel for scheduling a PDSCH. In this embodiment, the downlink control channel may be an enhanced physical downlink control channel (Enhanced Physical Downlink Control Channel, EPDCCH for short), or may be a physical downlink control channel (PDCCH).

It should be noted that, in all the embodiments of the present invention, the PDSCH scheduled by the downlink control channel refers to a PDSCH scheduled in a DCI format corresponding to the downlink control channel, or refers to a PDSCH scheduled in DCI carried on the downlink control channel.

102. Determine a resource allocation scheme of the PDSCH according to a downlink control information DCI format of the downlink control channel for scheduling the PDSCH and an attribute of a carrier for carrying the PDSCH.

Specifically, the downlink control information (Downlink Control Information, DCI for short) carried on the downlink control channel is used to indicate downlink or uplink scheduling information, where the DCI used to indicate the downlink scheduling information may be in multiple DCI formats. In addition, the attribute of the carrier may include a carrier type, a transmission mode, and the like.

103. Decode the PDSCH according to the resource allocation scheme of the PDSCH and a transmission scheme of the PDSCH.

Specifically, the UE determines, according to the determined resource allocation scheme and resource block allocation indication information in the DCI, a physical resource (physical resource block) allocated to the PDSCH, and decodes the PDSCH in the determined physical resource according to the transmission scheme of the PDSCH.

In a scenario of this embodiment, the resource allocation scheme may be determined according to a DCI format and a carrier type. Correspondingly, the attribute includes a carrier type; and step 102 includes:

if the DCI format of the downlink control channel is format 1A, and the carrier for carrying the PDSCH is of a new carrier type (New Carrier Type, NCT for short), and a value of a virtual resource block (Virtual Resource Block, VRB for short) assignment flag in the DCI format is 1, determining that the resource allocation scheme of the PDSCH is resource allocation type 2 and that a VRB to physical resource block (Physical Resource Block, PRB for short) mapping mechanism in any one timeslot is consistent with a VRB to PRB mapping mechanism in an even timeslot in a case of distributed VRBs in LTE Release 11.

It should be noted that, in all the embodiments of the present invention, consistency between a VRB to PRB mapping mechanism in any one timeslot and a VRB to PRB mapping mechanism in an even timeslot in a case of distributed VRBs in LTE Release 11 may also be described as consistency between a VRB to PRB mapping mechanism and a VRB to PRB mapping mechanism in an even timeslot in a case of distributed VRBs in LTE Release 11.

It should be noted that, distributed VRBs in LTE Release 11 are the same as distributed VRBs in earlier releases. Alternatively, in the determined resource allocation scheme, a VRB to PRB mapping mechanism in any one timeslot may also be consistent with a VRB to PRB mapping mechanism in an odd timeslot in a case of distributed VRBs in LTE Release 11, or a VRB to PRB mapping mechanism in any one timeslot in an even subframe is consistent with a VRB to PRB mapping mechanism in an even timeslot in a case of distributed VRBs in LTE Release 11 and a VRB to PRB mapping mechanism in any one timeslot in an odd subframe is consistent with a VRB to PRB mapping mechanism in an odd timeslot in a case of distributed VRBs in LTE Release 11, or a VRB to PRB mapping mechanism in any one timeslot in an even subframe is consistent with a VRB to PRB mapping mechanism in an odd timeslot in a case of distributed VRBs in LTE Release 11 and a VRB to PRB mapping mechanism in any one timeslot in an odd subframe is consistent with a VRB to PRB mapping mechanism in an even timeslot in a case of distributed VRBs in LTE Release 11.

Optionally, the attribute includes a carrier type; and step 102 includes:

if the DCI format of the downlink control channel is format 1A, and the carrier for carrying the PDSCH is a backward-compatible carrier, and a value of a VRB assignment flag in the DCI format is 1, determining that the resource allocation scheme of the PDSCH is a first resource allocation scheme; or if the DCI format of the downlink control channel is format 1A, and the carrier for carrying the PDSCH is of a new carrier type, and a value of a VRB assignment flag in the DCI format is 1, determining that the resource allocation scheme of the PDSCH is a second resource allocation scheme;

where the first resource allocation scheme is a resource allocation scheme corresponding to distributed VRBs in resource allocation type 2 in LTE Release 11, and VRB to PRB mapping mechanisms of the second resource allocation scheme and the first resource allocation scheme are not exactly the same.

Further, the second resource allocation scheme is resource allocation type 2, and a VRB to PRB mapping mechanism in any one timeslot is consistent with a VRB to PRB mapping mechanism in an even timeslot in a case of distributed VRBs in LTE Release 11.

In another scenario of this embodiment, the attribute includes a transmission mode; and the determining a resource allocation scheme of the PDSCH according to a downlink control information DCI format of the downlink control channel for scheduling the PDSCH and an attribute of a carrier for carrying the PDSCH includes:

if the DCI format of the downlink control channel is format 1A, and a value of a VRB assignment flag in the DCI format is 1, and a transmission mode of the carrier for carrying the PDSCH is transmission mode x, where x is an integer greater than 10, determining that the resource allocation scheme of the PDSCH is resource allocation type 2, and that a VRB to PRB mapping mechanism in any one timeslot is consistent with a VRB to PRB mapping mechanism in an even timeslot in a case of distributed VRBs in LTE Release 11.

For example, transmission mode x may be transmission mode 11 or 12 or the like. It should be noted that, in all the embodiments of the present invention, that a transmission mode of the carrier for carrying the PDSCH is transmission mode x means that a transmission mode configured for the carrier for carrying the PDSCH is transmission mode x.

Optionally, the attribute includes a transmission mode; and step 102 includes:

if the DCI format of the downlink control channel is format 1A, and a transmission mode of the carrier for carrying the PDSCH is transmission mode y, where y is a positive integer not greater than 10, and a value of a VRB assignment flag in the DCI format is 1, determining that the resource allocation scheme of the PDSCH is a first resource allocation scheme; or if the DCI format of the downlink control channel is format 1A, and a transmission mode of the carrier for carrying the PDSCH is transmission mode x, where x is an integer greater than 10, and a value of a VRB assignment flag in the DCI format is 1, determining that the resource allocation scheme of the PDSCH is a second resource allocation scheme;

where the first resource allocation scheme is a resource allocation scheme corresponding to distributed VRBs in resource allocation type 2 in LTE Release 11, and VRB to PRB mapping mechanisms of the second resource allocation scheme and the first resource allocation scheme are not exactly the same.

Transmission mode y may be any one of transmission modes 1 to 10. In the resource allocation scheme corresponding to distributed VRBs in resource allocation type 2 in LTE Release 11, a VRB to PRB mapping mechanism in an odd timeslot is different from a VRB to PRB mapping mechanism in an even timeslot, so that two VRBs in different timeslots in a same VRB pair are mapped to PRBs in different PRB pairs respectively.

Further, the second resource allocation scheme is resource allocation type 2, and a VRB to PRB mapping mechanism in any one timeslot is consistent with a VRB to PRB mapping mechanism in an even timeslot in a case of distributed VRBs in LTE Release 11.

In another scenario of this embodiment, the attribute includes a carrier type; and step 102 includes:

if the DCI format of the downlink control channel is format 1C, and the carrier for carrying the PDSCH is of a new carrier type, determining that the resource allocation scheme of the PDSCH is resource allocation type 2 and that a VRB to PRB mapping mechanism in any one timeslot is consistent with a VRB to PRB mapping mechanism in an even timeslot in a case of distributed VRBs in LTE Release 11.

Optionally, the attribute includes a carrier type; and step 102 includes:

if the DCI format of the downlink control channel is format 1C, and the carrier for carrying the PDSCH is a backward-compatible carrier, determining that the resource allocation scheme of the PDSCH is a first resource allocation scheme; or if the DCI format of the downlink control channel is format 1C, and the carrier for carrying the PDSCH is of a new carrier type, determining that the resource allocation scheme of the PDSCH is a second resource allocation scheme;

where the first resource allocation scheme is a resource allocation scheme corresponding to distributed VRBs in resource allocation type 2 in LTE Release 11, and VRB to PRB mapping mechanisms of the second resource allocation scheme and the first resource allocation scheme are not exactly the same.

Further, the second resource allocation scheme is resource allocation type 2, and a VRB to PRB mapping mechanism in any one timeslot is consistent with a VRB to PRB mapping mechanism in an even timeslot in a case of distributed VRBs in LTE Release 11.

In another scenario of this embodiment, the attribute includes a transmission mode; and step 102 includes:

if the DCI format of the downlink control channel is format 1C, and a transmission mode configured for the carrier for carrying the PDSCH is transmission mode x, where x is an integer greater than 10, determining that the resource allocation scheme of the PDSCH is resource allocation type 2, and that a VRB to PRB mapping mechanism in any one timeslot is consistent with a VRB to PRB mapping mechanism in an even timeslot in a case of distributed VRBs in LTE Release 11.

Optionally, the attribute includes a transmission mode; and step 102 includes:

if the DCI format of the downlink control channel is format 1C, and a transmission mode of the carrier for carrying the PDSCH is transmission mode y, where y is a positive integer not greater than 10, determining that the resource allocation scheme of the PDSCH is a first resource allocation scheme; or if the DCI format of the downlink control channel is format 1A, and a transmission mode of the carrier for carrying the PDSCH is transmission mode x, where x is an integer greater than 10, determining that the resource allocation scheme of the PDSCH is a second resource allocation scheme;

where the first resource allocation scheme is a resource allocation scheme corresponding to distributed VRBs in resource allocation type 2 in LTE Release 11, and VRB to PRB mapping mechanisms of the second resource allocation scheme and the first resource allocation scheme are not exactly the same.

Further, the second resource allocation scheme is resource allocation type 2, and a VRB to PRB mapping mechanism in any one timeslot is consistent with a VRB to PRB mapping mechanism in an even timeslot in a case of distributed VRBs in LTE Release 11.

In another scenario of this embodiment, the attribute includes a carrier type; and step 102 includes:

if the DCI format of the downlink control channel is a DCI format corresponding to resource allocation type 2, and the carrier for carrying the PDSCH is of a new carrier type, determining that the resource allocation scheme of the PDSCH is resource allocation type 2 and that a VRB to PRB mapping mechanism in any one timeslot is consistent with a VRB to PRB mapping mechanism in an even timeslot in a case of distributed VRBs in LTE Release 11.

The DCI format corresponding to resource allocation type 2 includes format 1A, format 1C, or the like, or the DCI format corresponding to resource allocation type 2 may be a newly added DCI format in LTE Release 12, for example, may be DCI format 1E.

Optionally, the attribute includes a transmission mode; and step 102 includes:

if the DCI format of the downlink control channel is a DCI format corresponding to resource allocation type 2, and a transmission mode configured for the carrier for carrying the PDSCH is transmission mode x, where x is an integer greater than 10, determining that the resource allocation scheme of the PDSCH is resource allocation type 2 and that a VRB to PRB mapping mechanism in any one timeslot is consistent with a VRB to PRB mapping mechanism in an even timeslot in a case of distributed VRBs in LTE Release 11.

Optionally, the attribute includes a transmission mode; and step 102 includes:

if the DCI format of the downlink control channel is format 1A, and a transmission mode of the carrier for carrying the PDSCH is transmission mode x, where x is an integer greater than 10, determining that the resource allocation scheme of the PDSCH is resource allocation type 0 and that a bit quantity used to indicate resource block allocation according to resource allocation type 0 in the DCI is consistent with a bit quantity used to indicate resource block allocation according to resource allocation type 2 in the DCI.

In this case, in order that the bit quantity used to indicate resource block allocation according to resource allocation type 0 in the DCI is consistent with the bit quantity used to indicate resource block allocation according to resource allocation type 2 in the DCI, scheduling of the user equipment needs to be limited to only some PRB pairs in a system bandwidth.

Optionally, the attribute includes a carrier type; and step 102 includes:

if the DCI format of the downlink control channel is format 1A, and the carrier for carrying the PDSCH is of a new carrier type, determining that the resource allocation scheme of the PDSCH is resource allocation type 0 and that a bit quantity used to indicate resource block allocation according to resource allocation type 0 in the DCI is consistent with a bit quantity used to indicate resource block allocation according to resource allocation type 2 in the DCI.

Optionally, the attribute includes a transmission mode; and the determining a resource allocation scheme of the PDSCH according to a downlink control information DCI format of the downlink control channel for scheduling the PDSCH and an attribute of a carrier for carrying the PDSCH includes:

if the DCI format of the downlink control channel is format 1A, and a transmission mode of the carrier for carrying the PDSCH is transmission mode x, where x is an integer greater than 10, determining that the resource allocation scheme of the PDSCH is resource allocation type 1 and that a bit quantity used to indicate resource block allocation according to resource allocation type 1 in the DCI is consistent with a bit quantity used to indicate resource block allocation according to resource allocation type 2 in the DCI.

Generally, before step 103, the transmission scheme of the PDSCH needs to be further determined. There are also multiple manners for determining the transmission scheme. Typically, before step 103, the method further includes:

determining the transmission scheme of the PDSCH according to the DCI format of the downlink control channel for scheduling the PDSCH and the attribute of the carrier for carrying the PDSCH.

In a scenario, the transmission scheme may be determined according to a DCI format and a carrier type. Correspondingly, the attribute includes a carrier type; and the determining the transmission scheme of the PDSCH according to the DCI format of the downlink control channel for scheduling the PDSCH and the attribute of the carrier for carrying the PDSCH includes:

if the DCI format of the downlink control channel is format 1A, and the carrier for carrying the PDSCH is of a new carrier type, determining that the transmission scheme of the PDSCH is a random beamforming scheme based on demodulation reference signal (DMRS) antenna port 7 and antenna port 9.

Optionally, the attribute includes a carrier type; and the determining the transmission scheme of the PDSCH according to the DCI format of the downlink control channel for scheduling the PDSCH and the attribute of the carrier for carrying the PDSCH includes:

if the DCI format of the downlink control channel is format 1A, and the carrier for carrying the PDSCH is of a new carrier type, determining that the transmission scheme of the PDSCH is a DMRS-based transmit diversity scheme.

Optionally, the attribute includes a carrier type; and the determining the transmission scheme of the PDSCH according to the DCI format of the downlink control channel for scheduling the PDSCH and the attribute of the carrier for carrying the PDSCH includes:

if the DCI format of the downlink control channel is format 1A, and the carrier for carrying the PDSCH is of a new carrier type, determining that the transmission scheme of the PDSCH is a random beamforming scheme based on DMRS antenna port 7 and antenna port 9 or a DMRS-based transmit diversity scheme; or if the DCI format of the downlink control channel is format 1A, and the carrier for carrying the PDSCH is a backward-compatible carrier, determining that the transmission scheme of the PDSCH is a transmit diversity scheme based on a cell-specific reference signal (Cell-specific Reference Signal, CRS for short), a single antenna port scheme based on CRS antenna port 0, or a single antenna port scheme based on DMRS antenna port 7.

Optionally, the attribute includes a carrier type; and the determining the transmission scheme of the PDSCH according to the DCI format of the downlink control channel for scheduling the PDSCH and the attribute of the carrier for carrying the PDSCH includes:

when the DCI format of the downlink control channel is format 1A, and the carrier for carrying the PDSCH is of a new carrier type, if a value of a VRB assignment flag in the DCI format is 1, determining that the transmission scheme of the PDSCH is a random beamforming scheme based on DMRS antenna port 7 and antenna port 9, or if a value of a VRB assignment flag in the DCI format is 0, determining that the transmission scheme of the PDSCH is a single antenna port scheme based on DMRS antenna port 7.

Optionally, the attribute includes a carrier type; and the determining the transmission scheme of the PDSCH according to the DCI format of the downlink control channel for scheduling the PDSCH and the attribute of the carrier for carrying the PDSCH includes:

if the DCI format of the downlink control channel is format 1C, and the carrier for carrying the PDSCH is of a new carrier type, determining that the transmission scheme of the PDSCH is a random beamforming scheme based on DMRS antenna port 7 and antenna port 9.

Optionally, the attribute includes a carrier type; and the determining the transmission scheme of the PDSCH according to the DCI format of the downlink control channel for scheduling the PDSCH and the attribute of the carrier for carrying the PDSCH includes:

if the DCI format of the downlink control channel is format 1C, and the carrier for carrying the PDSCH is of a new carrier type, determining that the transmission scheme of the PDSCH is a DMRS-based transmit diversity scheme.

Optionally, the attribute includes a carrier type; and the determining the transmission scheme of the PDSCH according to the DCI format of the downlink control channel for scheduling the PDSCH and the attribute of the carrier for carrying the PDSCH includes:

if the DCI format of the downlink control channel is format 1C, and the carrier for carrying the PDSCH is of a new carrier type, determining that the transmission scheme of the PDSCH is a random beamforming scheme based on DMRS antenna port 7 and antenna port 9 or a DMRS-based transmit diversity scheme; or if the DCI format of the downlink control channel is format 1C, and the carrier for carrying the PDSCH is a backward-compatible carrier, determining that the transmission scheme of the PDSCH is a CRS-based transmit diversity scheme or a single antenna port scheme based on CRS antenna port 0.

In another scenario, the transmission scheme is determined according to a transmission mode of the carrier and a DCI format. Correspondingly, the attribute includes a transmission mode; and the determining the transmission scheme of the PDSCH according to the DCI format of the downlink control channel for scheduling the PDSCH and the attribute of the carrier for carrying the PDSCH includes:

if the DCI format of the downlink control channel is format 1A, and a transmission mode of the carrier for carrying the PDSCH is transmission mode x, where x is an integer greater than 10, determining that the transmission scheme of the PDSCH is a random beamforming scheme based on DMRS antenna port 7 and antenna port 9.

Optionally, the attribute includes a transmission mode; and the determining the transmission scheme of the PDSCH according to the DCI format of the downlink control channel for scheduling the PDSCH and the attribute of the carrier for carrying the PDSCH includes:

if the DCI format of the downlink control channel is format 1A, and a transmission mode of the carrier for carrying the PDSCH is transmission mode x, where x is an integer greater than 10, determining that the transmission scheme of the PDSCH is a DMRS-based transmit diversity scheme.

Optionally, the attribute includes a transmission mode; and the determining the transmission scheme of the PDSCH according to the downlink control information DCI format of the downlink control channel for scheduling the PDSCH and the attribute of the carrier for carrying the PDSCH includes:

if the DCI format of the downlink control channel is format 1A, and a transmission mode of the carrier for carrying the PDSCH is transmission mode x, where x is an integer greater than 10, determining that the transmission scheme of the PDSCH is a random beamforming scheme based on DMRS antenna port 7 and antenna port 9 or a DMRS-based transmit diversity scheme; or if the DCI format of the downlink control channel is format 1A, and a transmission mode of the carrier for carrying the PDSCH is transmission mode y, where y is a positive integer not greater than 10, determining that the transmission scheme of the PDSCH is a CRS-based transmit diversity scheme, a single antenna port scheme based on CRS antenna port 0, or a single antenna port scheme based on DMRS antenna port 7.

Optionally, the attribute includes a transmission mode; and the determining the transmission scheme of the PDSCH according to the DCI format of the downlink control channel for scheduling the PDSCH and the attribute of the carrier for carrying the PDSCH includes:

when a transmission mode of the carrier for carrying the PDSCH is transmission mode x, where x is an integer greater than 10, if the DCI format of the downlink control channel is format a, determining that the transmission scheme of the PDSCH is a random beamforming scheme based on DMRS antenna port 7 and antenna port 9 or a DMRS-based transmit diversity scheme, or if the DCI format of the downlink control channel is format 1A, determining that the transmission scheme of the PDSCH is a single antenna port scheme based on DMRS antenna port 7, where format a is any one DCI format except formats 0, 1, 1A, 1B, 1C, 1D, 2, 2A, 2B, 2C, 2D, 3, 3A, and 4.

Optionally, the attribute includes a transmission mode; and the determining the transmission scheme of the PDSCH according to the DCI format of the downlink control channel for scheduling the PDSCH and the attribute of the carrier for carrying the PDSCH includes:

when a transmission mode of the carrier for carrying the PDSCH is transmission mode x, where x is an integer greater than 10, if the DCI format of the downlink control channel is format 1A, determining that the transmission scheme of the PDSCH is a random beamforming scheme based on DMRS antenna port 7 and antenna port 9 or a DMRS-based transmit diversity scheme.

Optionally, the attribute includes a transmission mode; and the determining the transmission scheme of the PDSCH according to the DCI format of the downlink control channel for scheduling the PDSCH and the attribute of the carrier for carrying the PDSCH includes:

when the DCI format of the downlink control channel is format 1A, and a transmission mode of the carrier for carrying the PDSCH is transmission mode x, where x is an integer greater than 10, if a value of a VRB assignment flag in the DCI format is 1, determining that the transmission scheme of the PDSCH is a random beamforming scheme based on DMRS antenna port 7 and antenna port 9, a DMRS-based transmit diversity scheme, or a random beamforming scheme based on DMRS antenna port 7 and antenna port 8, or if a value of a VRB assignment flag in the DCI format is 0, determining that the transmission scheme of the PDSCH is a single antenna port scheme based on DMRS antenna port 7.

Optionally, the attribute includes a transmission mode; and the determining the transmission scheme of the PDSCH according to the DCI format of the downlink control channel for scheduling the PDSCH and the attribute of the carrier for carrying the PDSCH includes:

when the DCI format of the downlink control channel is format 1A, and a transmission mode of the carrier for carrying the PDSCH is transmission mode x, where x is an integer greater than 10, if a value of a VRB assignment flag in the DCI format is 0, determining that the transmission scheme of the PDSCH is a random beamforming scheme based on DMRS antenna port 7 and antenna port 9, a DMRS-based transmit diversity scheme, or a random beamforming scheme based on DMRS antenna port 7 and antenna port 8, or if a value of a VRB assignment flag in the DCI format is 1, determining that the transmission scheme of the PDSCH is a single antenna port scheme based on DMRS antenna port 7.

Optionally, the attribute includes a transmission mode; and the determining the transmission scheme of the PDSCH according to the DCI format of the downlink control channel for scheduling the PDSCH and the attribute of the carrier for carrying the PDSCH includes:

if the DCI format of the downlink control channel is format 1C, and a transmission mode of the carrier for carrying the PDSCH is transmission mode x, where x is an integer greater than 10, determining that the transmission scheme of the PDSCH is a random beamforming scheme based on DMRS antenna port 7 and antenna port 9.

Optionally, the attribute includes a transmission mode; and the determining the transmission scheme of the PDSCH according to the DCI format of the downlink control channel for scheduling the PDSCH and the attribute of the carrier for carrying the PDSCH includes:

if the DCI format of the downlink control channel is format 1C, and a transmission mode of the carrier for carrying the PDSCH is transmission mode x, where x is an integer greater than 10, determining that the transmission scheme of the PDSCH is a DMRS-based transmit diversity scheme.

The transmission scheme may also be determined according to a DCI format, which is similar to the foregoing determining of the transmission scheme according to a DCI format and a carrier attribute. Correspondingly, before step 103, the method further includes:

determining the transmission scheme of the PDSCH according to the DCI format of the downlink control channel for scheduling the PDSCH.

Further, the determining the transmission scheme of the PDSCH according to the DCI format of the downlink control channel for scheduling the PDSCH includes:

if the DCI format of the downlink control channel is format a, determining that the transmission scheme of the PDSCH is a random beamforming scheme based on DMRS antenna port 7 and antenna port 9, where format a is any one DCI format except formats 0, 1, 1A, 1B, 1C, 1D, 2, 2A, 2B, 2C, 2D, 3, 3A, and 4.

Optionally, the determining the transmission scheme of the PDSCH according to the DCI format of the downlink control channel for scheduling the PDSCH includes:

if the DCI format of the downlink control channel is format a, determining that the transmission scheme of the PDSCH is a DMRS-based transmit diversity scheme, where format a is any one DCI format except formats 0, 1, 1A, 1B, 1C, 1D, 2, 2A, 2B, 2C, 2D, 3, 3A, and 4.

In the embodiment of the present invention, a downlink control channel for scheduling a PDSCH is detected; a resource allocation scheme of the PDSCH is determined according to a downlink control information DCI format of the downlink control channel for scheduling the PDSCH and an attribute of a carrier for carrying the PDSCH; and the PDSCH is decoded according to the resource allocation scheme of the PDSCH and a transmission scheme of the PDSCH. Thereby an effective solution to PDSCH transmission is provided.

Figure 2:
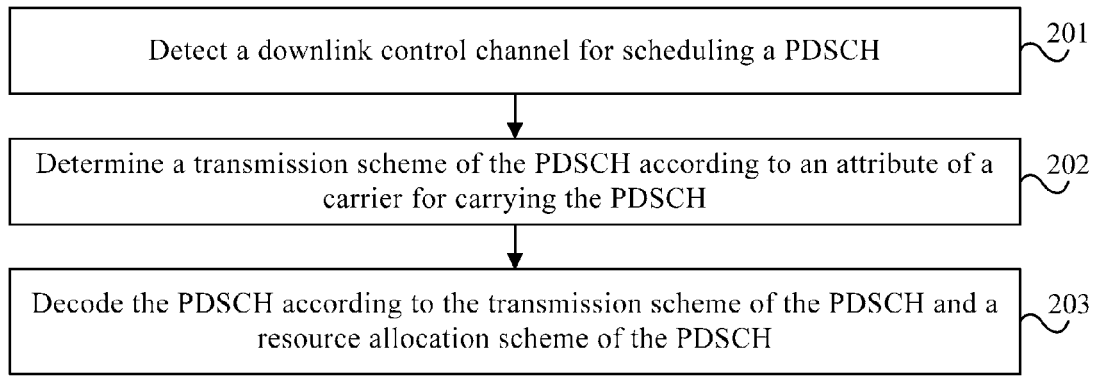
FIG. 2 is a schematic flowchart of a PDSCH transmission method according to Embodiment 2 of the present invention.

FIG. 2 is a schematic flowchart of a PDSCH transmission method according to Embodiment 2 of the present invention. As shown in FIG. 2, the method includes:

201. Detect a downlink control channel for scheduling a PDSCH.

For example, a UE detects a downlink control channel for scheduling a PDSCH. In this embodiment, the downlink control channel may be an EPDCCH, or may be a PDCCH.

202. Determine a transmission scheme of the PDSCH according to an attribute of a carrier for carrying the PDSCH.

Specifically, the attribute of the carrier may include a carrier type, a transmission mode, and the like.

203. Decode the PDSCH according to the transmission scheme of the PDSCH and a resource allocation scheme of the PDSCH.

Specifically, the UE determines, according to the determined resource allocation scheme and resource block allocation indication information in DCI, a physical resource (physical resource block) allocated to the PDSCH, and decodes the PDSCH in the determined physical resource according to the transmission scheme of the PDSCH.

In a scenario of this embodiment, the transmission scheme may be determined according to a carrier type. Correspondingly, the attribute includes a carrier type; and step 202 includes:

when the carrier for carrying the PDSCH is of a new carrier type, if a subframe for carrying the PDSCH is a first subframe, determining that the transmission scheme of the PDSCH is a single antenna port scheme based on DMRS antenna port 7; or if a subframe for carrying the PDSCH is a second subframe, determining that the transmission scheme of the PDSCH is a DMRS-based transmit diversity scheme.

Optionally, the attribute includes a carrier type; and step 202 includes:

when the carrier for carrying the PDSCH is of a new carrier type, if a bandwidth for carrying the PDSCH completely or partly overlaps a bandwidth for carrying a first signal, determining that the transmission scheme of the PDSCH is a single antenna port scheme based on DMRS antenna port 7, or otherwise, determining that the transmission scheme of the PDSCH is a DMRS-based transmit diversity scheme, where the first signal includes one or more of a channel state information-reference signal (Channel State Information-Reference Signal, CSI-RS for short), a CRS, a primary synchronization signal (PSS), a secondary synchronization signal (SSS), a discovery reference signal (Discovery Reference Signal, DRS for short), and a broadcast channel.

It should be noted that, in this embodiment, a case in which the first signal includes multiple types include a case in which the first signal includes all the foregoing types.

In another scenario of this embodiment, the transmission scheme may be determined according to a transmission mode of the carrier. Correspondingly, the attribute includes a transmission mode; and step 202 includes:

when a transmission mode of the carrier for carrying the PDSCH is transmission mode x, where x is an integer greater than 10, if a subframe for carrying the PDSCH is a first subframe, determining that the transmission scheme of the PDSCH is a single antenna port scheme based on DMRS antenna port 7; or if a subframe for carrying the PDSCH is a second subframe, determining that the transmission scheme of the PDSCH is a DMRS-based transmit diversity scheme.

Specifically, the first subframe is a subframe carrying a first signal, and the second subframe is a subframe not carrying the first signal, where the first signal includes one or more of a CSI-RS, a CRS, a PSS, an SSS, a DRS, and a broadcast channel; or the second subframe is a subframe for transmitting only the PDSCH and a DMRS, and the first subframe is any other subframe than the second subframe; or the first subframe is a multicast broadcast single frequency network (Multicast Broadcast Single Frequency Network, MBSFN for short) subframe, and the second subframe is a non-MBSFN subframe.

Optionally, the attribute includes a transmission mode; and step 202 includes:

when a transmission mode of the carrier for carrying the PDSCH is transmission mode x, where x is an integer greater than 10, if a bandwidth for carrying the PDSCH completely or partly overlaps a bandwidth for carrying a first signal, determining that the transmission scheme of the PDSCH is a single antenna port scheme based on DMRS antenna port 7, or otherwise, determining that the transmission scheme of the PDSCH is a DMRS-based transmit diversity scheme, where the first signal includes one or more of a CSI-RS, a CRS, a PSS, an SSS, a DRS, and a broadcast channel.

Further, in a process of determining the transmission scheme, a DCI format may be further considered. Correspondingly, step 202 includes:

determining the transmission scheme of the PDSCH according to a DCI format of the downlink control channel for scheduling the PDSCH and the attribute of the carrier for carrying the PDSCH.

In a scenario, the transmission scheme may be determined according to a DCI format and a carrier type. Correspondingly, the attribute includes a carrier type; and the determining the transmission scheme of the PDSCH according to a DCI format of the downlink control channel for scheduling the PDSCH and the attribute of the carrier for carrying the PDSCH includes:

when the DCI format of the downlink control channel is format 1A, if the carrier for carrying the PDSCH is of a new carrier type, determining that the transmission scheme of the PDSCH is a random beamforming scheme based on DMRS antenna port 7 and antenna port 9 or a DMRS-based transmit diversity scheme.

Optionally, the attribute includes a carrier type; and the determining the transmission scheme of the PDSCH according to a DCI format of the downlink control channel for scheduling the PDSCH and the attribute of the carrier for carrying the PDSCH includes:

when the DCI format of the downlink control channel is format 1A, and the carrier for carrying the PDSCH is of a new carrier type, if a value of a VRB assignment flag in the DCI format is 1, determining that the transmission scheme of the PDSCH is a random beamforming scheme based on DMRS antenna port 7 and antenna port 9, or if a value of a VRB assignment flag in the DCI format is 0, determining that the transmission scheme of the PDSCH is a single antenna port scheme based on DMRS antenna port 7.

Optionally, the attribute includes a carrier type; and the determining the transmission scheme of the PDSCH according to a DCI format of the downlink control channel for scheduling the PDSCH and the attribute of the carrier for carrying the PDSCH includes:

if the DCI format of the downlink control channel is format 1C, and the carrier for carrying the PDSCH is of a new carrier type, determining that the transmission scheme of the PDSCH is a random beamforming scheme based on DMRS antenna port 7 and antenna port 9 or a DMRS-based transmit diversity scheme.

In another scenario, the transmission scheme may be determined according to a transmission mode of the carrier and a DCI format. Correspondingly, the attribute includes a transmission mode; and the determining the transmission scheme of the PDSCH according to a DCI format of the downlink control channel for scheduling the PDSCH and the attribute of the carrier for carrying the PDSCH includes:

when the DCI format of the downlink control channel is format 1A, if a transmission mode of the carrier for carrying the PDSCH is transmission mode x, where x is an integer greater than 10, determining that the transmission scheme of the PDSCH is a random beamforming scheme based on DMRS antenna port 7 and antenna port 9 or a DMRS-based transmit diversity scheme.

Optionally, the attribute includes a transmission mode; and the determining the transmission scheme of the PDSCH according to a DCI format of the downlink control channel for scheduling the PDSCH and the attribute of the carrier for carrying the PDSCH includes:

when a transmission mode of the carrier for carrying the PDSCH is transmission mode x, where x is an integer greater than 10, if the DCI format of the downlink control channel is format a, determining that the transmission scheme of the PDSCH is a random beamforming scheme based on DMRS antenna port 7 and antenna port 9 or a DMRS-based transmit diversity scheme, or if the DCI format of the downlink control channel is format 1A, determining that the transmission scheme of the PDSCH is a single antenna port scheme based on DMRS antenna port 7, where format a is any one DCI format except formats 0, 1, 1A, 1B, 1C, 1D, 2, 2A, 2B, 2C, 2D, 3, 3A, and 4.

Optionally, the attribute includes a transmission mode; and the determining the transmission scheme of the PDSCH according to a DCI format of the downlink control channel for scheduling the PDSCH and the attribute of the carrier for carrying the PDSCH includes:

when the DCI format of the downlink control channel is format 1A, and a transmission mode of the carrier for carrying the PDSCH is transmission mode x, where x is an integer greater than 10, if a value of a VRB assignment flag in the DCI format is 1, determining that the transmission scheme of the PDSCH is a random beamforming scheme based on DMRS antenna port 7 and antenna port 9, a DMRS-based transmit diversity scheme, or a random beamforming scheme based on DMRS antenna port 7 and antenna port 8, or if a value of a VRB assignment flag in the DCI format is 0, determining that the transmission scheme of the PDSCH is a single antenna port scheme based on DMRS antenna port 7.

Optionally, the attribute includes a transmission mode; and the determining the transmission scheme of the PDSCH according to a DCI format of the downlink control channel for scheduling the PDSCH and the attribute of the carrier for carrying the PDSCH includes:

when the DCI format of the downlink control channel is format 1A, and a transmission mode of the carrier for carrying the PDSCH is transmission mode x, where x is an integer greater than 10, if a value of a VRB assignment flag in the DCI format is 0, determining that the transmission scheme of the PDSCH is a random beamforming scheme based on DMRS antenna port 7 and antenna port 9, a DMRS-based transmit diversity scheme, or a random beamforming scheme based on DMRS antenna port 7 and antenna port 8, or if a value of a virtual resource block VRB assignment flag in the DCI format is 1, determining that the transmission scheme of the PDSCH is a single antenna port scheme based on DMRS antenna port 7.

Optionally, the attribute includes a transmission mode; and the determining the transmission scheme of the PDSCH according to a DCI format of the downlink control channel for scheduling the PDSCH and the attribute of the carrier for carrying the PDSCH includes:

when the DCI format of the downlink control channel is format 1C, if a transmission mode of the carrier for carrying the PDSCH is transmission mode x, determining that the transmission scheme of the PDSCH is a random beamforming scheme based on DMRS antenna port 7 and antenna port 9 or a DMRS-based transmit diversity scheme.

Optionally, the attribute includes a transmission mode; and the determining the transmission scheme of the PDSCH according to a DCI format of the downlink control channel for scheduling the PDSCH and the attribute of the carrier for carrying the PDSCH includes:

when a transmission mode of the carrier for carrying the PDSCH is transmission mode x, where x is an integer greater than 10, if the DCI format of the downlink control channel is format a, determining that the transmission scheme of the PDSCH is a random beamforming scheme based on DMRS antenna port 7 and antenna port 9 or a DMRS-based transmit diversity scheme, where format a is any one DCI format except formats 0, 1, 1A, 1B, 1C, 1D, 2, 2A, 2B, 2C, 2D, 3, 3A, and 4.

Generally, before step 203, the resource allocation scheme of the PDSCH needs to be further determined. There are also multiple manners for determining the resource allocation scheme. Typically, before step 203, the method further includes:

determining the resource allocation scheme of the PDSCH according to the DCI format of the downlink control channel for scheduling the PDSCH.

Optionally, the determining the resource allocation scheme of the PDSCH according to the DCI format of the downlink control channel for scheduling the PDSCH includes:

if the DCI format of the downlink control channel is format a, determining that the resource allocation scheme of the PDSCH is resource allocation type 2 and that a virtual resource block VRB to physical resource block PRB mapping mechanism in any one timeslot is consistent with a VRB to PRB mapping mechanism in an even timeslot in a case of distributed VRBs in LTE Release 11, where format a is any one DCI format except formats 0, 1, 1A, 1B, 1C, 1D, 2, 2A, 2B, 2C, 2D, 3, 3A, and 4.

In the embodiment of the present invention, a downlink control channel for scheduling a PDSCH is detected; a transmission scheme of the PDSCH is determined according to an attribute of a carrier for carrying the PDSCH; and the PDSCH is decoded according to the transmission scheme of the PDSCH and a resource allocation scheme of the PDSCH. Thereby an effective solution to PDSCH transmission is provided.

Figure 3:
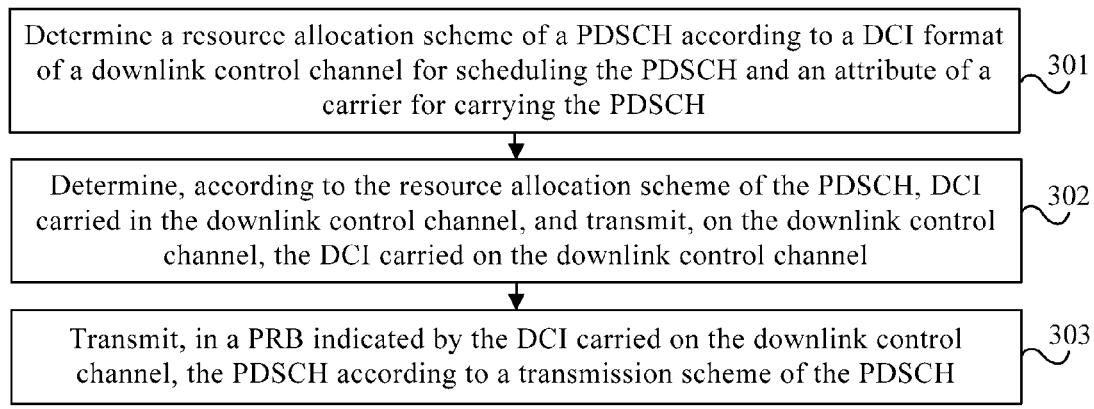
FIG. 3 is a schematic flowchart of a PDSCH transmission method according to Embodiment 3 of the present invention.

FIG. 3 is a schematic flowchart of a PDSCH transmission method according to Embodiment 3 of the present invention. As shown in FIG. 3, the method includes:

301. Determine a resource allocation scheme of a PDSCH according to a DCI format of a downlink control channel for scheduling the PDSCH and an attribute of a carrier for carrying the PDSCH.

For example, a eNodeB determines a resource allocation scheme of a PDSCH according to a DCI format of a downlink control channel for scheduling the PDSCH and an attribute of a carrier for carrying the PDSCH. In this embodiment, the downlink control channel may be an EPDCCH, or may be a PDCCH. Specifically, DCI carried on the downlink control channel is used to indicate downlink or uplink scheduling information, where the DCI used to indicate the downlink scheduling information may be in multiple DCI formats. In addition, the attribute of the carrier may include a carrier type, a transmission mode, and the like.

302. Determine, according to the resource allocation scheme of the PDSCH, DCI carried on the downlink control channel, and transmit, on the downlink control channel, the DCI carried on the downlink control channel.

303. Transmit, in a PRB indicated by the DCI carried on the downlink control channel, the PDSCH according to a transmission scheme of the PDSCH.

In a scenario of this embodiment, the resource allocation scheme may be determined according to a carrier type. Correspondingly, the attribute includes a carrier type; and step 301 includes:

if the DCI format of the downlink control channel is format 1A or format 1C, and the carrier for carrying the PDSCH is of a new carrier type, determining that the resource allocation scheme of the PDSCH is resource allocation type 2 and that a VRB to PRB mapping mechanism in any one timeslot is consistent with a VRB to PRB mapping mechanism in an even timeslot in a case of distributed VRBs in LTE Release 11.

It should be noted that, distributed VRBs in LTE Release 11 are the same as distributed VRBs in earlier releases. Alternatively, in the determined resource allocation scheme, a VRB to PRB mapping mechanism in any one timeslot may also be consistent with a VRB to PRB mapping mechanism in an odd timeslot in a case of distributed VRBs in LTE Release 11, or a VRB to PRB mapping mechanism in any one timeslot in an even subframe is consistent with a VRB to PRB mapping mechanism in an even timeslot in a case of distributed VRBs in LTE Release 11 and a VRB to PRB mapping mechanism in any one timeslot in an odd subframe is consistent with a VRB to PRB mapping mechanism in an odd timeslot in a case of distributed VRBs in LTE Release 11, or a VRB to PRB mapping mechanism in any one timeslot in an even subframe is consistent with a VRB to PRB mapping mechanism in an odd timeslot in a case of distributed VRBs in LTE Release 11 and a VRB to PRB mapping mechanism in any one timeslot in an odd subframe is consistent with a VRB to PRB mapping mechanism in an even timeslot in a case of distributed VRBs in LTE Release 11.

Further, after the resource allocation scheme is determined, the eNodeB may further set a VRB assignment flag in the DCI to a corresponding value, so that a UE knows the resource allocation method selected by the eNodeB. Specifically, if the DCI format of the downlink control channel is format 1A, the value of the VRB assignment flag in the DCI format is set to 1.

Optionally, the attribute includes a carrier type; and step 301 includes:

if the DCI format of the downlink control channel is a DCI format corresponding to resource allocation type 2, and the carrier for carrying the PDSCH is of a new carrier type, determining that the resource allocation scheme of the PDSCH is resource allocation type 2 and that a VRB to PRB mapping mechanism in any one timeslot is consistent with a VRB to PRB mapping mechanism in an even timeslot in a case of distributed VRBs in LTE Release 11.

Specifically, the DCI format corresponding to resource allocation type 2 includes format 1A, format 1C, or the like, or the DCI format corresponding to resource allocation type 2 may be a newly added DCI format in LTE Release 12, for example, may be DCI format 1E.

In another scenario of this embodiment, the resource allocation scheme may be determined according to a transmission mode of the carrier. Correspondingly, the attribute includes a transmission mode; and step 301 includes:

if the DCI format of the downlink control channel is format 1A or format 1C, and a transmission mode of the carrier for carrying the PDSCH is transmission mode x, where x is an integer greater than 10, determining that the resource allocation scheme of the PDSCH is resource allocation type 2, and that a VRB to PRB mapping mechanism in any one timeslot is consistent with a VRB to PRB mapping mechanism in an even timeslot in a case of distributed VRBs in LTE Release 11.

Further, after the resource allocation method is determined, the eNodeB may further set a VRB assignment flag in the DCI to a corresponding value, so that a UE knows the resource allocation method selected by the eNodeB. Specifically, if the DCI format of the downlink control channel is format 1A, the value of the VRB assignment flag in the DCI format is set to 1.

Optionally, the attribute includes a transmission mode; and step 301 includes:

if the DCI format of the downlink control channel is a DCI format corresponding to resource allocation type 2, and a transmission mode of the carrier for carrying the PDSCH is transmission mode x, where x is an integer greater than 10, determining that the resource allocation scheme of the PDSCH is resource allocation type 2 and that a VRB to PRB mapping mechanism in any one timeslot is consistent with a VRB to PRB mapping mechanism in an even timeslot in a case of distributed VRBs in LTE Release 11.

For example, transmission mode x may be transmission mode 11 or 12 or the like.

Generally, before step 303, the transmission scheme of the PDSCH needs to be further determined. There are also multiple manners for determining the transmission scheme. Typically, before step 303, the method further includes:

determining the transmission scheme of the PDSCH according to the DCI format of the downlink control channel for scheduling the PDSCH and the attribute of the carrier for carrying the PDSCH.

In a scenario, the transmission scheme may be determined according to a DCI format and a carrier type. Correspondingly, the attribute includes a carrier type; and the determining the transmission scheme of the PDSCH according to the DCI format of the downlink control channel for scheduling the PDSCH and the attribute of the carrier for carrying the PDSCH includes:

when the DCI format of the downlink control channel is format 1A or format 1C, if the carrier for carrying the PDSCH is of a new carrier type, determining that the transmission scheme of the PDSCH is a random beamforming scheme based on DMRS antenna port 7 and antenna port 9 or a DMRS-based transmit diversity scheme.

Optionally, the attribute includes a carrier type; and the determining the transmission scheme of the PDSCH according to the DCI format of the downlink control channel for scheduling the PDSCH and the attribute of the carrier for carrying the PDSCH includes:

when the DCI format of the downlink control channel is format 1A, and the carrier for carrying the PDSCH is of a new carrier type, if a value of a VRB assignment flag in the DCI format is 1, determining that the transmission scheme of the PDSCH is a random beamforming scheme based on DMRS antenna port 7 and antenna port 9, or if a value of a VRB assignment flag in the DCI format is 0, determining that the transmission scheme of the PDSCH is a single antenna port scheme based on DMRS antenna port 7.

In another scenario, the transmission scheme may be determined according to a transmission mode of the carrier and a DCI format. Correspondingly, the attribute includes a transmission mode; and the determining the transmission scheme of the PDSCH according to the DCI format of the downlink control channel for scheduling the PDSCH and the attribute of the carrier for carrying the PDSCH includes:

when the DCI format of the downlink control channel is format 1A or format 1C, if a transmission mode of the carrier for carrying the PDSCH is transmission mode x, where x is an integer greater than 10, determining that the transmission scheme of the PDSCH is a random beamforming scheme based on DMRS antenna port 7 and antenna port 9 or a DMRS-based transmit diversity scheme.

Optionally, the attribute includes a transmission mode; and the determining the transmission scheme of the PDSCH according to the DCI format of the downlink control channel for scheduling the PDSCH and the attribute of the carrier for carrying the PDSCH includes:

when a transmission mode of the carrier for carrying the PDSCH is transmission mode x, where x is an integer greater than 10, if the DCI format of the downlink control channel is format a, determining that the transmission scheme of the PDSCH is a random beamforming scheme based on DMRS antenna port 7 and antenna port 9 or a DMRS-based transmit diversity scheme, or if the DCI format of the downlink control channel is format 1A, determining that the transmission scheme of the PDSCH is a single antenna port scheme based on DMRS antenna port 7, where format a is any one DCI format except formats 0, 1, 1A, 1B, 1C, 1D, 2, 2A, 2B, 2C, 2D, 3, 3A, and 4.

Optionally, the attribute includes a transmission mode; and the determining the transmission scheme of the PDSCH according to the DCI format of the downlink control channel for scheduling the PDSCH and the attribute of the carrier for carrying the PDSCH includes:

when the DCI format of the downlink control channel is format 1A, and a transmission mode of the carrier for carrying the PDSCH is transmission mode x, where x is an integer greater than 10, if a value of a VRB assignment flag in the DCI format is 1, determining that the transmission scheme of the PDSCH is a random beamforming scheme based on DMRS antenna port 7 and antenna port 9, a DMRS-based transmit diversity scheme, or a random beamforming scheme based on DMRS antenna port 7 and antenna port 8, or if a value of a VRB assignment flag in the DCI format is 0, determining that the transmission scheme of the PDSCH is a single antenna port scheme based on DMRS antenna port 7.

Alternatively, step 302 includes:

determining, according to the resource allocation scheme of the PDSCH, resource block allocation information in the DCI carried on the downlink control channel, and determining, according to the transmission scheme of the PDSCH, a value of a VRB assignment flag in the DCI carried on the downlink control channel.

Specifically, the determining, according to the transmission scheme of the PDSCH, a value of a VRB assignment flag in the DCI carried on the downlink control channel includes:

if the transmission scheme of the PDSCH is a random beamforming scheme based on DMRS antenna port 7 and antenna port 9, a DMRS-based transmit diversity scheme, or a random beamforming scheme based on DMRS antenna port 7 and antenna port 8, setting the value of the VRB assignment flag in the DCI to 1; or if the transmission scheme of the PDSCH is a single antenna port scheme based on DMRS antenna port 7, setting the value of the VRB assignment flag in the DCI to 0.

In another scenario, the transmission scheme may be determined according to a DCI format. Correspondingly, before step 303, the method further includes:

determining the transmission scheme of the PDSCH according to the DCI format of the downlink control channel for scheduling the PDSCH.

Specifically, the determining the transmission scheme of the PDSCH according to the DCI format of the downlink control channel for scheduling the PDSCH includes:

if the DCI format of the downlink control channel is new DCI format a, determining that the transmission scheme of the PDSCH is a random beamforming scheme based on DMRS antenna port 7 and antenna port 9 or a DMRS-based transmit diversity scheme, where format a is any one DCI format except formats 0, 1, 1A, 1B, 1C, 1D, 2, 2A, 2B, 2C, 2D, 3, 3A, and 4; or if the DCI format of the downlink control channel is format 1A, determining that the transmission scheme of the PDSCH is a single antenna port scheme based on DMRS antenna port 7.

In the embodiment of the present invention, a resource allocation scheme of a PDSCH is determined according to a DCI format of a downlink control channel for scheduling the PDSCH and an attribute of a carrier for carrying the PDSCH; DCI carried on the downlink control channel is determined according to the resource allocation scheme of the PDSCH, and the DCI carried on the downlink control channel is transmitted on the downlink control channel; and the PDSCH is transmitted, according to a transmission scheme of the PDSCH, in a PRB indicated by the DCI carried on the downlink control channel. Thereby an effective solution to PDSCH transmission is provided.

Figure 4:
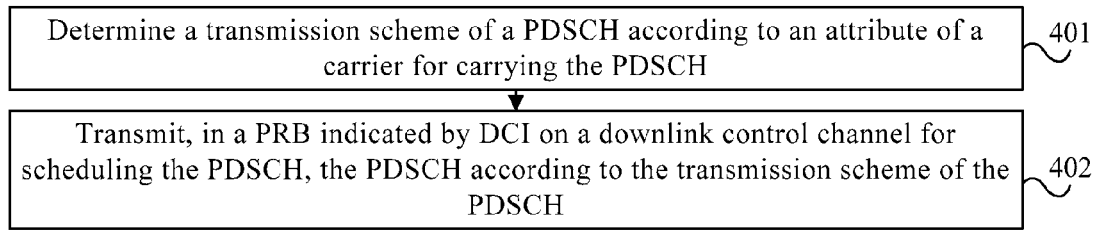
FIG. 4 is a schematic flowchart of a PDSCH transmission method according to Embodiment 4 of the present invention.

FIG. 4 is a schematic flowchart of a PDSCH transmission method according to Embodiment 4 of the present invention. As shown in FIG. 4, the method includes:

401. Determine a transmission scheme of a PDSCH according to an attribute of a carrier for carrying the PDSCH.

For example, a eNodeB determines a transmission scheme of a PDSCH according to an attribute of a carrier for carrying the PDSCH. Specifically, the attribute may include a carrier type, a transmission mode, and the like.

402. Transmit, in a PRB indicated by DCI on a downlink control channel for scheduling the PDSCH, the PDSCH according to the transmission scheme of the PDSCH.

In this embodiment, the downlink control channel may be an EPDCCH, or may be a PDCCH. Specifically, the DCI carried on the downlink control channel is used to indicate downlink or uplink scheduling information, where the DCI used to indicate the downlink scheduling information may be in multiple DCI formats.

In a scenario of this embodiment, the transmission scheme may be determined according to a carrier type. Correspondingly, the attribute includes a carrier type; and step 401 includes:

when the carrier for carrying the PDSCH is of a new carrier type, if a subframe for carrying the PDSCH is a first subframe, determining that the transmission scheme of the PDSCH is a single antenna port scheme based on DMRS antenna port 7; or if a subframe for carrying the PDSCH is a second subframe, determining that the transmission scheme of the PDSCH is a DMRS-based transmit diversity scheme.

Specifically, the first subframe is a subframe carrying a first signal, and the second subframe is a subframe not carrying the first signal, where the first signal includes one or more of a CSI-RS, a CRS, a PSS, an SSS, a DRS, and a broadcast channel; or the second subframe is a subframe for transmitting only the PDSCH and a DMRS, and the first subframe is any other subframe than the second subframe; or the first subframe is an MBSFN subframe, and the second subframe is a non-MBSFN subframe.

In another scenario of this embodiment, the transmission scheme may be determined according to a carrier type. Correspondingly, the attribute includes a carrier type; and step 401 includes:

when the carrier for carrying the PDSCH is of a new carrier type, if a bandwidth for carrying the PDSCH completely or partly overlaps a bandwidth for carrying a first signal, determining that the transmission scheme of the PDSCH is a single antenna port scheme based on DMRS antenna port 7, or otherwise, determining that the transmission scheme of the PDSCH is a DMRS-based transmit diversity scheme, where the first signal includes one or more of a CSI-RS, a CRS, a PSS, an SSS, a DRS, and a broadcast channel.

Alternatively, in addition to the attribute of the carrier, a DCI format may be further considered in a process of determining the transmission scheme. Correspondingly, step 401 includes:

determining the transmission scheme of the PDSCH according to a DCI format of the downlink control channel for scheduling the PDSCH and the attribute of the carrier for carrying the PDSCH.

In a scenario of this embodiment, a resource allocation scheme may be determined according to a DCI format and a carrier type. Correspondingly, the attribute includes a carrier type; and the determining the transmission scheme of the PDSCH according to a DCI format of the downlink control channel for scheduling the PDSCH and the attribute of the carrier for carrying the PDSCH includes:

when the DCI format of the downlink control channel is format 1A or format 1C, if the carrier for carrying the PDSCH is of a new carrier type, determining that the transmission scheme of the PDSCH is a random beamforming scheme based on DMRS antenna port 7 and antenna port 9 or a DMRS-based transmit diversity scheme.

Optionally, the attribute includes a carrier type; and the determining the transmission scheme of the PDSCH according to a DCI format of the downlink control channel for scheduling the PDSCH and the attribute of the carrier for carrying the PDSCH includes:

when the DCI format of the downlink control channel is format 1A, and the carrier for carrying the PDSCH is of a new carrier type, if a value of a VRB assignment flag in the DCI format is 1, determining that the transmission scheme of the PDSCH is a random beamforming scheme based on DMRS antenna port 7 and antenna port 9, or if a value of a VRB assignment flag in the DCI format is 0, determining that the transmission scheme of the PDSCH is a single antenna port scheme based on DMRS antenna port 7.

In a scenario of this embodiment, a resource allocation scheme may be determined according to a transmission mode of the carrier and a DCI format. Correspondingly, the attribute includes a transmission mode; and the determining the transmission scheme of the PDSCH according to a DCI format of the downlink control channel for scheduling the PDSCH and the attribute of the carrier for carrying the PDSCH includes:

when the DCI format of the downlink control channel is format 1A or format 1C, if a transmission mode of the carrier for carrying the PDSCH is transmission mode x, where x is an integer greater than 10, determining that the transmission scheme of the PDSCH is a random beamforming scheme based on DMRS antenna port 7 and antenna port 9 or a DMRS-based transmit diversity scheme.

Optionally, the attribute includes a transmission mode; and the determining the transmission scheme of the PDSCH according to a DCI format of the downlink control channel for scheduling the PDSCH and the attribute of the carrier for carrying the PDSCH includes:

when a transmission mode configured for the carrier for carrying the PDSCH is transmission mode x, where x is an integer greater than or equal to 10, if the DCI format of the downlink control channel is format a, determining that the transmission scheme of the PDSCH is a random beamforming scheme based on DMRS antenna port 7 and antenna port 9 or a DMRS-based transmit diversity scheme, or if the DCI format of the downlink control channel is format 1A, determining that the transmission scheme of the PDSCH is a single antenna port scheme based on DMRS antenna port 7, where format a is any one DCI format except formats 0, 1, 1A, 1B, 1C, 1D, 2, 2A, 2B, 2C, 2D, 3, 3A, and 4.

Optionally, the attribute includes a transmission mode; and the determining the transmission scheme of the PDSCH according to a DCI format of the downlink control channel for scheduling the PDSCH and the attribute of the carrier for carrying the PDSCH includes:

when the DCI format of the downlink control channel is format 1A, and a transmission mode of the carrier for carrying the PDSCH is transmission mode x, where x is an integer greater than 10, if a value of a VRB assignment flag in the DCI format is 1, determining that the transmission scheme of the PDSCH is a random beamforming scheme based on DMRS antenna port 7 and antenna port 9, a DMRS-based transmit diversity scheme, or a random beamforming scheme based on DMRS antenna port 7 and antenna port 8, or if a value of a VRB assignment flag in the DCI format is 0, determining that the transmission scheme of the PDSCH is a single antenna port scheme based on DMRS antenna port 7.

Generally, before step 402, the DCI is determined according to a resource allocation scheme of the PDSCH. Correspondingly, before step 402, the method further includes:

determining, according to a resource allocation scheme of the PDSCH, resource block allocation information in the DCI carried on the downlink control channel, and determining, according to the transmission scheme of the PDSCH, a value of a VRB assignment flag in the DCI carried on the downlink control channel.

Specifically, the determining, according to the transmission scheme of the PDSCH, a value of a VRB assignment flag in the DCI carried on the downlink control channel includes:

if the transmission scheme of the PDSCH is a random beamforming scheme based on DMRS antenna port 7 and antenna port 9, a DMRS-based transmit diversity scheme, or a random beamforming scheme based on DMRS antenna port 7 and antenna port 8, setting the value of the VRB assignment flag in the DCI to 1; or if the transmission scheme of the PDSCH is a single antenna port scheme based on DMRS antenna port 7, setting the value of the VRB assignment flag in the DCI to 0.

Generally, before step 402, or specifically, before the DCI is determined, a resource allocation scheme of the PDSCH needs to be further determined. There are also multiple manners for determining the resource allocation scheme. Typically, before step 402, the method further includes:

determining the resource allocation scheme of the PDSCH according to the DCI format of the downlink control channel for scheduling the PDSCH.

Specifically, the determining the resource allocation scheme of the PDSCH according to the DCI format of the downlink control channel for scheduling the PDSCH includes:

if the DCI format of the downlink control channel is format a, determining that the resource allocation scheme of the PDSCH is resource allocation type 2 and that a VRB to PRB mapping mechanism in any one timeslot is consistent with a VRB to PRB mapping mechanism in an even timeslot in a case of distributed VRBs in Long Term Evolution LTE Release 11, where format a is any one DCI format except formats 0, 1, 1A, 1B, 1C, 1D, 2, 2A, 2B, 2C, 2D, 3, 3A, and 4.

In the embodiment of the present invention, a transmission scheme of a PDSCH is determined according to an attribute of a carrier for carrying the PDSCH; and the PDSCH is transmitted, according to the transmission scheme of the PDSCH, in a PRB indicated by DCI on a downlink control channel for scheduling the PDSCH. Thereby an effective solution to PDSCH transmission is provided.

Based on the foregoing embodiments of the present invention, the following describes four specific total solutions covering a UE side and a eNodeB side.

Total solution 1 includes solution 1 on the UE side and solution 1 on the eNodeB side.

Solution 1 on the UE side includes the following steps 1a to 3a.

Step 1a: A UE detects a downlink control channel for scheduling a PDSCH.

In an embodiment of the present invention, the downlink control channel may be an EPDCCH or a PDCCH. The downlink control channel in this step is used for scheduling the PDSCH. In an LTE system, DCI carried on the downlink control channel is used to indicate downlink or uplink scheduling information, where the DCI used to indicate the downlink scheduling information may be in multiple DCI formats, and the user equipment determines, according to a higher layer configuration, a DCI format that needs to be detected. For example, if the UE is configured to decode a downlink control channel on which CRC is scrambled by an SI-RNTI, an RA-RNTI, and a P-RNTI, the UE needs to detect DCI formats 1C and 1A; or if the UE is configured to decode a downlink control channel on which CRC bits are scrambled by a C-RNTI or an SPS C-RNTI, the UE needs to further determine, according to a configured transmission mode, a DCI format that needs to be detected. For example, when the transmission mode configured for the user equipment is transmission mode 9, the user equipment needs to detect DCI format 2C and DCI format 1A; and when the transmission mode configured for the user equipment is transmission mode 10, the user equipment needs to detect DCI format 2D and DCI format 1A. If the UE is configured to decode a downlink control channel on which CRC is scrambled by a Temporary C-RNTI, and is not configured to decode a downlink control channel on which CRC is scrambled by a C-RNTI, the user equipment needs to detect DCI format 1C and DCI format 1.

In this step, the user equipment determines, according to the higher layer configuration, the DCI format that needs to be detected, and thereby performs blind detection on various possible DCI formats in each downlink subframe in which the PDSCH may be transmitted.

Step 2a: The user equipment determines a resource allocation scheme of the PDSCH based on a DCI format of the downlink control channel and an attribute of a carrier for carrying the PDSCH.

In this step, the user equipment determines the resource allocation scheme of the physical downlink shared channel based on the DCI format of the downlink control channel and the attribute of the carrier for carrying the physical downlink shared channel scheduled by the downlink control channel. That is, the user equipment determines the resource allocation scheme of the PDSCH based on the downlink control information format of the downlink control channel detected in step 1a and the attribute of the carrier for carrying the PDSCH scheduled by the downlink control channel. Specifically, step 2a may further include the following two steps:

Step 2a-1: The user equipment determines the attribute of the carrier for carrying the physical downlink shared channel.

The attribute of the carrier in this step may be a carrier type of the carrier. The carrier type includes a new carrier type and a backward-compatible carrier.

In this step, the user equipment may first determine the carrier for carrying the physical downlink shared channel scheduled by the downlink control channel. In a specific carrier aggregation scenario and in a case of cross-carrier scheduling, the user equipment may determine, according to a carrier indicator field (CIF) field in the downlink control information format of the downlink control channel, the carrier for carrying the PDSCH; or in a carrier aggregation scenario and in a case of intra-carrier scheduling, the carrier for carrying the downlink control channel is the carrier for carrying the PDSCH; if only one carrier is configured for the user equipment, the carrier for carrying the PDSCH is the carrier configured for the user equipment.

After determining the carrier for carrying the PDSCH, the user equipment determines the attribute of the carrier. The user equipment may determine the attribute of the carrier according to the following manners:

(1) The User Equipment Determines the Attribute of the Carrier According to a Higher Layer Signaling Configuration.

In this manner, the user equipment may determine the attribute of the carrier according to the higher layer signaling configuration. For example, when the carrier is configured for the user equipment, higher layer signaling may be used to notify the user equipment that the carrier is of the new carrier type.

(2) Determine the Attribute of the Carrier According to a Transmission Mode Configured for the Carrier.

In this manner, the user equipment may determine the attribute of the carrier according to the transmission mode configured for the carrier. For example, if the transmission mode configured for the carrier is any one transmission mode in transmission mode 1 to transmission mode 10, the carrier is a backward-compatible carrier; or if the transmission mode configured for the carrier is transmission mode 11, the carrier is of the new carrier type; and in this case, step 2a-1 may be that the user equipment determines the transmission mode of the carrier for carrying the physical downlink shared channel.

(3) Determine the Attribute of the Carrier According to a Location of a Synchronization Channel in the Carrier.

In this manner, the user equipment determines the attribute of the carrier by using the location of the synchronization channel. In this manner, the location of the synchronization channel in the carrier of the new carrier type is different from the location of the synchronization channel in a backward-compatible carrier. In this step, the location of the synchronization channel may refer to locations of a primary synchronization signal and a secondary synchronization signal, and specifically, may refer to time-domain locations of the primary synchronization signal and secondary synchronization signal, for example, indexes of time-domain symbols in which the primary synchronization signal and secondary synchronization signal are located. For example, in the new carrier type, the primary synchronization signal is located in the second time-domain symbol of a subframe, and the secondary synchronization signal is located in the third symbol of a subframe; and in the backward-compatible carrier, the primary synchronization signal is located in the seventh symbol of a subframe, and the secondary synchronization signal is located in the sixth symbol of a subframe. By detecting the synchronization signal, if it is found that the location of the synchronization channel is corresponding to the backward-compatible carrier, the user equipment determines that the carrier is the backward-compatible carrier; if it is found that the location of the synchronization channel is corresponding to the new carrier type, the user equipment determines that the carrier is of the new carrier type.

(4) Determine the Attribute of the Carrier According to a Broadcast Message.

Specifically, the user equipment accesses a broadcast channel, and determines the attribute of the carrier according to a broadcast message carried in the broadcast channel, where the broadcast message may be system information. Alternatively, a message indicating the carrier attribute, for example, indicating whether the corresponding carrier is of the new carrier type, is carried in the broadcast channel.

It should be noted that, step 2a-1 is not mandatory, that is, the user equipment may not perform the step of determining the attribute of the carrier.

Step 2a-2: The user equipment determines the resource allocation scheme of the physical downlink shared channel based on the downlink control information format of the downlink control channel and the attribute of the carrier for carrying the physical downlink shared channel.

In this step, the user equipment determines the resource allocation scheme of the physical downlink shared channel according to different DCI formats and the attribute of the carrier for carrying the physical downlink shared channel. Specifically, for PDSCHs scrambled by different RNTIs, an implementation manner of this step may vary. Specifically, this step may be described according to the following cases:

Case 1: Cyclic redundancy check (Cyclic Redundancy Check, CRC for short) on the downlink control channel corresponding to the PDSCH is scrambled by a cell radio network temporary identifier (Cell Radio Network Temporary Identifier, C-RNTI for short).

In this case, the UE is configured to decode the downlink control channel on which CRC is scrambled by the C-RNTI. In this case, this step may include the following manners:

Manner 1: If the DCI format of the downlink control channel is format 1A, and a value of a contiguous/distributed VRB assignment flag in the DCI format is 1, and the carrier for carrying the physical downlink shared channel is of the new carrier type, the resource allocation scheme of the physical downlink shared channel is a second resource allocation scheme; or if a value of a contiguous/distributed VRB assignment flag in the DCI format is 1, and the carrier for carrying the physical downlink shared channel is a backward-compatible carrier type, the resource allocation scheme of the physical downlink shared channel is a first resource allocation scheme; where VRB to PRB mapping mechanisms of the first resource allocation scheme and the second resource allocation scheme are not exactly the same.

In this manner, the attribute of the carrier for carrying the physical downlink shared channel may be first determined according to step 2a-1, and then the resource allocation scheme of the PDSCH is further determined according to the determined attribute of the carrier for carrying the physical downlink shared channel and DCI format 1A.

It should be noted that, in this manner, when the PDSCH uses the first resource allocation scheme, a transmission scheme of the PDSCH may be a CRS-based transmit diversity scheme or a single antenna port scheme based on CRS antenna port 0; or when the PDSCH uses the second resource allocation scheme, a transmission scheme of the PDSCH may be a single antenna port scheme based on DMRS antenna port 7, or a transmission scheme of the PDSCH is a DMRS-based transmit diversity scheme, or a transmission scheme of the PDSCH is a random beamforming scheme based on DMRS antenna port 7 and DMRS antenna port 9. It should be noted that, the user equipment may not need to determine the attribute of the carrier for carrying the PDSCH every time when DCI format 1A is detected.

Manner 2: If the DCI format of the downlink control channel is format 1A, and a value of a contiguous/distributed VRB assignment flag in the DCI format is 1, and a transmission mode configured for the carrier for carrying the physical downlink shared channel is a first transmission mode, the resource allocation scheme of the physical downlink shared channel is a second resource allocation scheme; or if the downlink control information format of the downlink control channel is format 1A, and a value of a contiguous/distributed VRB assignment flag in format 1A is 1, and a transmission mode configured for the carrier for carrying the physical downlink shared channel is one of transmission modes 1 to 10, the resource allocation scheme of the physical downlink shared channel is a first resource allocation scheme; where VRB to PRB mapping mechanisms of the first resource allocation scheme and the second resource allocation scheme are not exactly the same, and the first transmission mode is a transmission mode other than transmission mode 1 to transmission mode 10, for example, the first transmission mode is transmission mode 11.

In this manner, the user equipment may first determine, according to step 2a-1, the attribute of the carrier for carrying the physical downlink shared channel, that is, determine the transmission mode of the carrier for carrying the physical downlink shared channel, and then further determine a resource allocation scheme of the PDSCH according to the determined transmission mode of the carrier for carrying the physical downlink shared channel and DCI format 1A. It should be noted that, the user equipment may not need to determine the transmission mode of the carrier for carrying the PDSCH every time when DCI format 1A is detected. In addition, in this manner, the transmission scheme corresponding to the PDSCH may be the transmission scheme selected in manner 1, which is not further described herein.

Manner 3: If the DCI format of the downlink control channel is format 1A, and a value of a contiguous/distributed VRB assignment flag in the DCI format is 1, the resource allocation scheme of the physical downlink shared channel is a first resource allocation scheme; or if the DCI format of the downlink control channel is a first DCI format, the resource allocation scheme of the physical downlink shared channel is a second resource allocation scheme; where VRB to PRB mapping mechanisms in the first resource allocation scheme and the second resource allocation scheme are not exactly the same, and the first DCI format is any one DCI format except formats 0, 1, 1A, 1B, 1C, 1D, 2, 2A, 2B, 2C, 2D, 3, 3A, and 4.

In this manner, the first DCI format may not be any one DCI format in the existing LTE system, for example, may be a newly introduced DCI format. For example, the first DCI format is format 1E, or the DCI format is format 1A'.

In this manner, the user equipment may determine, according to the attribute of the carrier, the DCI format that needs to be detected. For example, if the carrier is of the new carrier type, or the transmission mode of the carrier is the first transmission mode, the user equipment detects only the first DCI format, or the user equipment detects the first DCI format and format 1A; when the DCI format that needs to be detected is determined according to the transmission mode, preferably, when the transmission mode of the carrier is the first transmission mode, the user equipment detects only the first DCI format. If the carrier is a backward-compatible carrier, or the transmission mode of the carrier is any one of transmission mode 1 to transmission mode 10, the user equipment detects only format 1A. It should be noted that, in the description herein, that the user equipment detects only the first DCI format means that the user equipment needs to detect only the first DCI format in the first DCI format and format 1A; that the user equipment detects only DCI format 1A means that the user equipment needs to detect only DCI format 1A in the first DCI format and format 1A; and it does not mean that the user equipment does not further detect other possible DCI formats than the first DCI format or DCI format 1A. In addition, in this manner, the transmission scheme corresponding to the PDSCH may use the transmission scheme selected in the manner described in manner 1, which is not further described herein.

It should be noted that, the foregoing description of case 1 is applicable to cases in which CRC on the downlink control channel corresponding to the PDSCH is scrambled by a semi-persistent scheduling (Semi-Persistent Scheduling, SPS for short) C-RNTI, a system information radio network temporary identifier (System Information-Radio Network Temporary Identifier, SI-RNTI for short), a paging radio network temporary identifier (Paging Radio Network Temporary Identifier, P-RNTI for short), a random access radio network temporary identifier (Random Access Radio Network Temporary Identifier, RA-RNTI for short), and a Temporary (Temporary) C-RNTI.

Case 2: CRC on the downlink control channel corresponding to the PDSCH is scrambled by an SI-RNTI.

In this case, the UE is configured to decode the downlink control channel on which CRC is scrambled by the SI-RNTI. In this case, this step may include the following manners:

Manner 1: If the downlink control information format of the downlink control channel is format 1C, and the carrier for carrying the physical downlink shared channel is of the new carrier type, the resource allocation scheme of the physical downlink shared channel is a second resource allocation scheme; or if the downlink control information format of the downlink control channel is format 1C, and the carrier for carrying the physical downlink shared channel is a backward-compatible carrier, the resource allocation scheme of the physical downlink shared channel is a first resource allocation scheme; where VRB to PRB mapping mechanisms of the first resource allocation scheme and the second resource allocation scheme are not exactly the same.

In this manner, the attribute of the carrier for carrying the physical downlink shared channel may be first determined according to step 2a-1, and then the resource allocation scheme of the PDSCH is further determined according to the determined attribute of the carrier for carrying the physical downlink shared channel and DCI format 1C. It should be noted that, in this manner, when the PDSCH uses the first resource allocation scheme, a transmission scheme corresponding to the PDSCH may use a CRS-based transmit diversity scheme or a single antenna port scheme based on CRS antenna port 0; or when the PDSCH uses the second resource allocation scheme, a transmission scheme corresponding to the PDSCH may use a single antenna port scheme based on DMRS antenna port 7, or use a DMRS-based transmit diversity scheme, or use a random beamforming scheme based on DMRS antenna port 7 and antenna port 9.

Manner 2: If the downlink control information format of the downlink control channel is format 1C, and a transmission mode configured for the carrier for carrying the physical downlink shared channel is a first transmission mode, the resource allocation scheme of the physical downlink shared channel is a second resource allocation scheme; or if the downlink control information format of the downlink control channel is format 1C, and a transmission mode configured for the carrier for carrying the physical downlink shared channel is any one of transmission modes 1 to 10, the resource allocation scheme of the physical downlink shared channel is a first resource allocation scheme; where virtual resource block to physical resource block mapping mechanisms of the first resource allocation scheme and the second resource allocation scheme are not exactly the same, and the first transmission mode is a transmission mode other than transmission mode 1 to transmission mode 10, for example, the first transmission mode is transmission mode 11.

In this manner, the user equipment may first determine, according to step 2a-1, the attribute of the carrier for carrying the physical downlink shared channel, that is, determine the transmission mode of the carrier for carrying the physical downlink shared channel, and then further determine the resource allocation scheme of the PDSCH according to the determined transmission mode of the carrier for carrying the physical downlink shared channel and format 1C (that is, detected downlink control channel corresponding to DCI format 1C). It should be noted that, the user equipment may not need to determine the transmission mode of the carrier for carrying the PDSCH every time when DCI format 1A is detected. In addition, in this manner, the transmission scheme corresponding to the PDSCH may use the transmission scheme selected in the manner described in manner 1, which is not further described herein.

Manner 3: If the downlink control information format of the downlink control channel is format 1C, the resource allocation scheme of the physical downlink shared channel is a first resource allocation scheme; or if the downlink control information format of the downlink control channel is a second DCI format, the resource allocation scheme of the physical downlink shared channel is a second resource allocation scheme; where virtual resource block to physical resource block mapping mechanisms in the first resource allocation scheme and the second resource allocation scheme are not exactly the same, and the second DCI format is any one DCI format except formats 0, 1, 1A, 1B, 1C, 1D, 2, 2A, 2B, 2C, 2D, 3, 3A, and 4.

In this manner, the second DCI format may not be any one DCI format in the existing LTE system, for example, may be a newly introduced DCI format. For example, the second DCI format is format 1E, or format 1A', or format 1F, or format 1C'. In addition, the second DCI format is the same as the first DCI format in case 1, which is preferable; or the second DCI format is different from the first DCI format in case 1.

In this manner, the user equipment may determine, according to the attribute of the carrier, the DCI format that needs to be detected. For example, if the carrier is of the new carrier type, and the new carrier type does not support any one of transmission mode 1 to transmission mode 10, or the transmission mode of the carrier is the first transmission mode, the user equipment detects only the second DCI format, or the user equipment detects the second DCI format and format 1A; or if the carrier is a backward-compatible carrier, or the transmission mode corresponding to the carrier is one of transmission mode 1 to transmission mode 10, the user equipment detects only DCI format 1C and format 1A. It should be noted that, in the description herein, that the user equipment detects only the second DCI format means that the user equipment needs to detect only the second DCI format in the second DCI format, format 1A, and format 1C; and that the user equipment detects only formats 1A and 1C means that the user equipment needs to detect only formats 1A and format 1C in the second DCI format, format 1A, and format 1C; and the rest may be inferred by analogy. In addition, in this manner, the transmission scheme corresponding to the PDSCH may use the transmission scheme selected in the manner described in manner 1, which is not further described herein.

It should be noted that, the description of case 2 is applicable to a case in which CRC on the downlink control channel corresponding to the PDSCH is scrambled by a P-RNTI and an RA-RNTI.

In addition to the foregoing case 1 and case 2, this step may further include the following possible implementation manners:

Manner 1: If the downlink control information format of the downlink control channel is corresponding to resource allocation type 2, and the carrier for carrying the physical downlink shared channel is of the new carrier type, the resource allocation scheme of the physical downlink shared channel is a second resource allocation scheme; or if the downlink control information format of the downlink control channel is corresponding to resource allocation type 2, and the carrier for carrying the physical downlink shared channel is a backward-compatible carrier, the resource allocation scheme of the physical downlink shared channel is a first resource allocation scheme; where virtual resource block to physical resource block mapping mechanisms of the first resource allocation scheme and the second resource allocation scheme are not exactly the same.

In addition, in this manner, the transmission scheme corresponding to the PDSCH may use the transmission scheme selected in the manner described in manner 1 in case 1 or case 2, which is not further described herein.

Manner 2: If the downlink control information format of the downlink control channel is corresponding to resource allocation type 2, and a transmission mode configured for the carrier for carrying the physical downlink shared channel is a first transmission mode, the resource allocation scheme of the physical downlink shared channel is a second resource allocation scheme; or if the downlink control information format of the downlink control channel is corresponding to resource allocation type 2, and a transmission mode configured for the carrier for carrying the physical downlink shared channel is one of transmission modes 1 to 10, the resource allocation scheme of the physical downlink shared channel is a first resource allocation scheme; where virtual resource block to physical resource block mapping mechanisms of the first resource allocation scheme and the second resource allocation scheme are not exactly the same. The first transmission mode is a transmission mode other than transmission mode 1 to transmission mode 10, for example, the first transmission mode is transmission mode 11.

In addition, in this manner, the transmission scheme corresponding to the PDSCH may use the transmission scheme selected in the manner described in manner 1 in case 1 or case 2, which is not further described herein.

Figure 5:
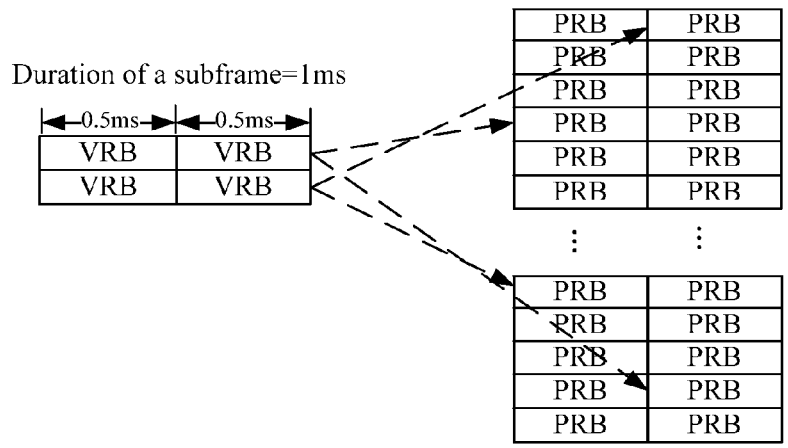
FIG. 5 is a schematic diagram of a first resource allocation scheme according to an embodiment of the present invention.
Figure 6:
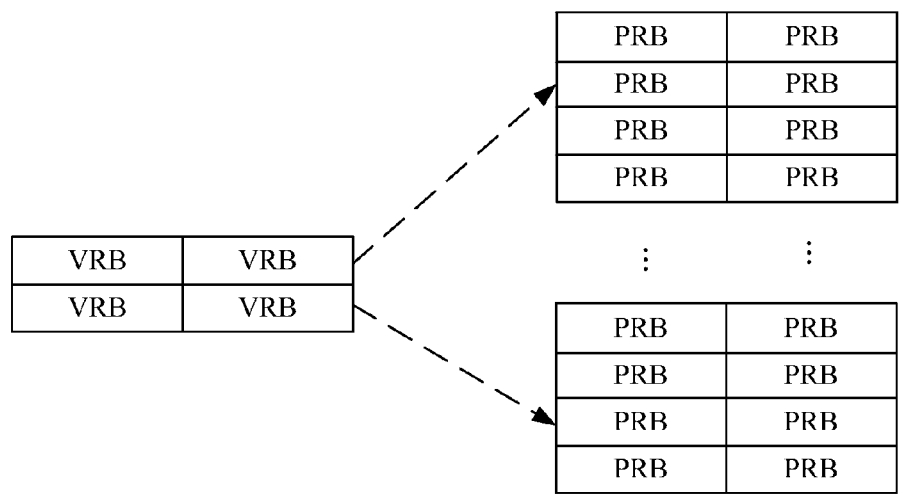
FIG. 6 is a schematic diagram of a second resource allocation scheme according to an embodiment of the present invention.

It should be noted that, both the first resource allocation scheme and the second resource allocation scheme may be a resource allocation scheme corresponding to distributed VRBs in resource allocation type 2, and a difference lies in a virtual resource block to physical resource block mapping mechanism. The first resource allocation scheme is an allocation manner of distributed VRBs in resource allocation type 2 in the existing LTE system; and the second resource allocation scheme is a modified allocation manner of distributed VRBs in resource allocation type 2. Specifically, in a VRB to PRB mapping, a mapping mechanism in an even timeslot in the first resource allocation scheme is used for both an even timeslot and an odd timeslot. FIG. 5 and FIG. 6 respectively show schematic diagrams of mappings in the first resource allocation scheme and the second resource allocation scheme. Specifically, two VRBs in a VRB pair (namely, two VRBs having a same VRB number) in the first resource allocation scheme are respectively mapped to different PRBs (namely, two PRBs having different PRB numbers) in two timeslots, that is, PRB numbers corresponding to the two timeslots are different; in the second resource allocation scheme, one VRB pair is mapped to one PRB pair, that is, two VRBs in the VRB pair are mapped to two PRBs having a same PRB number. Generally, the VRB number of the VRB pair is different from the PRB number of the PRB pair. It should be noted that, in the second resource allocation scheme, a mapping mechanism in an odd timeslot in the allocation manner of distributed VRBs in resource allocation type 2 may be used for VRB to PRB mappings in both an even timeslot and an odd timeslot, or a mapping mechanism in an even timeslot in the allocation manner of distributed VRBs in resource allocation type 2 is used for an even subframe, and a mapping mechanism in an odd timeslot in the allocation manner of distributed VRBs in resource allocation type 2 is used for an odd subframe.

The first resource allocation scheme is the allocation manner of distributed VRBs in resource allocation type 2 in the existing LTE system (LTE Rel-8/9/10/11). Herein, the mechanism of the scheme is briefly described as follows:

Table 1 shows values of $N_{gap}$ in different system bandwidths $N_{RB}^{DL}$. If $6 \leq N_{RB}^{DL} \leq 49$, only one gap value $N_{gap,1}$ is defined, and $N_{gap}=N_{gap,1}$. If $50 \leq N \times 110$, two gap values $N_{gap,1}$ and $N_{gap,2}$ are defined. Specifically, a downlink scheduling assignment is used to indicate $N_{gap}=N_{gap,1}$ or $N_{gap}=N_{gap,1}$. The downlink scheduling assignment may be corresponding to DCI format 1C or 1A.

TABLE 1

| System bandwidth ($N_{RB}^{DL}$) | 1st Gap ($N_{gap,1}$) | 2nd Gap ($N_{gap,2}$) |
|---|---|---|
| 6-10 | $\lceil N_{RB}^{DL}/2 \rceil$ | N/A |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

Distributed VRBs are numbered from 0 to $N_{VRB}^{DL}-1$, where $N_{VRB}^{DL}$ is a quantity of VRB pairs allocated to the PDSCH. When $N_{gap}=N_{gap,1}$, $N_{VRB}^{DL}=N_{VRBgap1}^{DL}=2 \cdot \min(N_{gap}^{DL}, N_{gap})$. When $N_{gap}=N_{gap,2}$, $N_{VRB}^{DL}=N_{VRBgap2}^{DL}=\lfloor N_{RB}^{DL}/2N_{gap} \rfloor \cdot 2N_{gap}$.

Contiguous $\tilde{N}_{VRB}^{DL}$ numbers form a VRB number interleaving unit, where when $N_{gap}=N_{gap,1}$, $\tilde{N}_{VRB}^{DL}=N_{VRB}^{DL}$, and when $N_{gap}=N_{gap,2}$, $\tilde{N}_{VRB}^{DL}=2N_{gap}$. In each interleaving unit, four columns and $N_{row}$ rows are used for interleaving of VRB numbers, where $N_{row}=\lceil \tilde{N}_{VRB}^{DL}/(4P) \rceil \cdot P$, and P is a size of a resource block group (Resource Block Group, RBG for short). VRB numbers are written into a matrix in a row-in column-out manner. $N_{null}$ 0s are inserted in the second column and the fourth column in last $N_{null}/2$ rows, where $N_{null}=4N_{row}-\tilde{N}_{VRB}^{DL}$. When data is output, inserted 0s are ignored. A VRB to PRB mapping is as follows:

For an even timeslot $n_s$, an number of a PRB to which a VRB is temporarily mapped satisfies:

$$\tilde{n}_{PRB}(n_s) = \begin{cases} \tilde{n}'_{PRB} - N_{row} & , N_{null} \neq 0 \text{ and } \tilde{n}_{VRB} \geq \tilde{N}_{VRB}^{DL} - N_{null} \text{ and } \tilde{n}_{VRB}\bmod 2 = 1 \\ \tilde{n}'_{PRB} - N_{row} + N_{null}/2 & , N_{null} \neq 0 \text{ and } \tilde{n}_{VRB} \geq \tilde{N}_{VRB}^{DL} - N_{null} \text{ and } \tilde{n}_{VRB}\bmod 2 = 0 \\ \tilde{n}''_{PRB} - N_{null}/2 & , N_{null} \neq 0 \text{ and } \tilde{n}_{VRB} < \tilde{N}_{VRB}^{DL} - N_{null} \text{ and } \tilde{n}_{VRB}\bmod 4 \geq 2 \\ \tilde{n}''_{PRB} & , \text{otherwise} \end{cases}$$

where, $\tilde{n}'_{PRB} = 2N_{row} \cdot (\tilde{n}_{VRB}\bmod 2) + \lfloor \tilde{n}_{VRB}/2 \rfloor + \tilde{N}_{VRB}^{DL} \cdot \lfloor n_{VRB}/\tilde{N}_{VRB}^{DL} \rfloor$, $\tilde{n}''_{PRB} = N_{row} \cdot (\tilde{n}_{VRB}\bmod 4) + \lfloor \tilde{n}_{VRB}/4 \rfloor + \tilde{N}_{VRB}^{DL} \cdot \lfloor n_{VRB}/\tilde{N}_{VRB}^{DL} \rfloor$, and $\tilde{n}_{VRB} = n_{VRB}\bmod \tilde{N}_{VRB}^{DL}$, where $n_{VRB}$ is obtained by using a downlink scheduling assignment.

For an odd timeslot $n_s$, an number of a PRB to which a VRB is temporarily mapped satisfies:

$\tilde{n}_{PRB}(n_s) = (\tilde{n}_{PRB}(n_s + \tilde{N}_{VRB}^{DL}/2)\bmod \tilde{N}_{VRB}^{DL} + N_{VRB}^{DL} \cdot \lfloor n_{VRB}/\tilde{N}_{VRB}^{DL} \rfloor$ Then for all timeslots, numbers of PRBs to which VRBs are mapped satisfy:

$$n_{PRB}(n_s) = \begin{cases} \tilde{n}_{PRB}(n_s), & \tilde{n}_{PRB}(n_s) < \tilde{N}_{VRB}^{DL}/2 \\ \tilde{n}_{PRB}(n_s) + N_{gap} - \tilde{N}_{VRB}^{DL}/2, & \tilde{n}_{PRB}(n_s) \geq \tilde{N}_{VRB}^{DL}/2 \end{cases}$$

In the embodiment of the present invention, the first resource allocation scheme may also be defined as the allocation manner of distributed VRBs in resource allocation type 2 in the existing LTE system (LTE Rel-8/9/10/11); and the second resource allocation scheme is defined as resource allocation type 3, where a difference between the allocation manner of distributed VRBs in resource allocation type 3 and that in resource allocation type 2 lies in that: a mapping mechanism in an even timeslot in the allocation manner of distributed VRBs in resource allocation type 2 is used for both an even timeslot and an odd timeslot in a VRB to PRB mapping, or a mapping mechanism in an odd timeslot in the allocation manner of distributed VRBs in resource allocation type 2 is used for both an even timeslot and an odd timeslot in a VRB to PRB mapping, or a mapping mechanism in an even timeslot in the allocation manner of distributed VRBs in resource allocation type 2 is used for an even subframe and a mapping mechanism in an odd timeslot in the allocation manner of distributed VRBs in resource allocation type 2 is used for an odd subframe. It should be noted that, resource allocation type 3 may also be another resource allocation manner.

In the second resource allocation scheme, in comparison with the first resource allocation scheme, because a mapping rule in an even timeslot or an odd timeslot in an existing mechanism is used for both an odd timeslot and an even timeslot, one VRB pair can be mapped to one PRB pair. This, on the one hand, enables the user equipment to perform interpolation between timeslots in DMRS-based channel estimation, and thereby improves channel estimation performance and improves PDSCH demodulation performance, and on the other hand, ensures that contiguous VRBs are mapped to distributed PRBs, so that a sufficient frequency-domain diversity gain can be obtained in PDSCH transmission and that PDSCH demodulation performance is improved. Furthermore, when performing channel estimation, the user equipment does not need to implement two channel estimation algorithms, one based on interpolation between timeslots and the other one based on only a DMRS in a timeslot, and thereby implementation complexity of the user equipment is reduced.

In this step, when information carried in the PDSCH is system information, a paging message, or a random access response, regardless of whether format 1C or format 1A is used for scheduling, the second resource allocation scheme is used for resource allocation on the PDSCH. Thereby, the PDSCH can be demodulated based on the DMRS, and distributed transmission can be implemented, and thereby a problem of how to design the transmission scheme of the PDSCH that carries the system information, paging message, and random access response in a carrier of an NCT is solved, and transmission performance of the PDSCH is improved.

Step 3a: The user equipment decodes the physical downlink shared channel based on the resource allocation scheme.

In this step, the user equipment determines, based on the resource allocation scheme determined in step 2a and a resource block allocation indication indicated in the DCI format, a physical resource allocated to the PDSCH, and thereby decodes the PDSCH in the determined physical resource. In this step, if the attribute of the carrier determined in step 2a is the new carrier type, this step further includes that the user equipment decodes the physical downlink shared channel based on the resource allocation scheme and DMRS-based transmission scheme. The DMRS-based transmission scheme may be a single antenna port scheme based on DMRS antenna port 7, or a transmit diversity scheme based on DMRS antenna port 7 and antenna port 9, or a random beamforming scheme based on DMRS antenna port 7 and antenna port 9, or a transmit diversity scheme based on DMRS antenna port 7 and antenna port 8, or a transmit diversity scheme based on DMRS antenna port 7/8/9/10. If the carrier attribute determined in step 2a is the backward-compatible carrier type, this step further includes that the user equipment decodes the physical downlink shared channel based on the resource allocation scheme and a CRS-based transmission scheme, where the CRS-based transmission scheme may be a CRS-based single antenna port transmission scheme or a CRS-based transmit diversity scheme.

Solution 1 on the eNodeB side includes the following steps 1b to 4b.

Step 1b: A eNodeB determines a resource allocation scheme of a physical downlink shared channel based on a downlink control information format of a downlink control channel for scheduling the physical downlink shared channel and an attribute of a carrier for carrying the physical downlink shared channel.

In this step, the eNodeB determines the resource allocation scheme of the physical downlink shared channel according to different DCI formats and the attribute of the carrier for carrying the physical downlink shared channel. Specifically, the following possible implementation methods may be included.

Manner 1: If the downlink control information format of the downlink control channel is format 1A, and the carrier for carrying the physical downlink shared channel is of a new carrier type, the resource allocation scheme of the physical downlink shared channel is a second resource allocation scheme; or if the downlink control information format of the downlink control channel is format 1A, and the carrier for carrying the physical downlink shared channel is of a backward-compatible carrier type, the resource allocation scheme of the physical downlink shared channel is a first resource allocation scheme; where virtual resource block to physical resource block mapping mechanisms of the first resource allocation scheme and the second resource allocation scheme are not exactly the same.

Manner 2: If the downlink control information format of the downlink control channel is format 1A, and a transmission mode configured for the carrier for carrying the physical downlink shared channel is a first transmission mode, the resource allocation scheme of the physical downlink shared channel is a second resource allocation scheme; or if the downlink control information format of the downlink control channel is format 1A, and a transmission mode configured for the carrier for carrying the physical downlink shared channel is a first transmission mode, the resource allocation scheme of the physical downlink shared channel is a first resource allocation scheme; where virtual resource block to physical resource block mapping mechanisms of the first resource allocation scheme and the second resource allocation scheme are not exactly the same.

Manner 3: If the downlink control information format of the downlink control channel is a first DCI format, the resource allocation scheme of the physical downlink shared channel is a second resource allocation scheme; where the first DCI format is any one DCI format except formats 0, 1, 1A, 1B, 1C, 1D, 2, 2A, 2B, 2C, 2D, 3, 3A, and 4.

Manner 4: If the downlink control information format of the downlink control channel is format 1C, and the carrier for carrying the physical downlink shared channel is of a new carrier type, the resource allocation scheme of the physical downlink shared channel is a second resource allocation scheme; or if the downlink control information format of the downlink control channel is format 1C, and the carrier for carrying the physical downlink shared channel is a backward-compatible carrier, the resource allocation scheme of the physical downlink shared channel is a first resource allocation scheme; where virtual resource block to physical resource block mapping mechanisms of the first resource allocation scheme and the second resource allocation scheme are not exactly the same.

Manner 5: If the downlink control information format of the downlink control channel is format 1C, and a transmission mode configured for the carrier for carrying the physical downlink shared channel is a first transmission mode, the resource allocation scheme of the physical downlink shared channel is a second resource allocation scheme; or if the downlink control information format of the downlink control channel is format 1C, and a transmission mode configured for the carrier for carrying the physical downlink shared channel is one of transmission modes 1 to 10, the resource allocation scheme of the physical downlink shared channel is a first resource allocation scheme; where virtual resource block to physical resource block mapping mechanisms of the first resource allocation scheme and the second resource allocation scheme are not exactly the same, and the first transmission mode is a transmission mode other than transmission mode 1 to transmission mode 10, for example, the first transmission mode is transmission mode 11.

The first transmission mode, the first DCI format, the first resource allocation scheme, and the second resource allocation scheme in the foregoing manner 1 to manner 5 are the same as those described above, and are not further described herein.

Step 2b: The eNodeB determines, according to the resource allocation scheme, downlink control information carried on the downlink control channel, and transmits, on the downlink control channel, the downlink control information carried on the downlink control channel.

The eNodeB determines the DCI according to the determined resource allocation scheme. For example, in this step, the eNodeB determines RB allocation information in the DCI based on the determined resource allocation scheme, namely, a PRB pair scheduled for a user equipment.

Step 3b: The eNodeB determines a transmission scheme of the physical downlink shared channel.

In this step, the eNodeB may determine the transmission scheme of the physical downlink shared channel according to the attribute of the carrier for carrying the physical downlink shared channel. If the carrier for carrying the physical downlink shared channel is of a new carrier type, the transmission scheme of the physical downlink shared channel is a DMRS-based transmission scheme, and the DMRS-based transmission scheme may be a single antenna port transmission scheme based on DMRS antenna port 7, or a transmit diversity transmission scheme based on DMRS antenna port 7 and antenna port 9, or a random beamforming scheme based on DMRS antenna port 7 and antenna port 9, or a transmit diversity scheme based on DMRS antenna port 7 and antenna port 8, or a transmit diversity scheme based on DMRS antenna port 7/8/9/10. If the carrier for carrying the physical downlink shared channel is of a backward-compatible carrier type, the transmission scheme of the physical downlink shared channel is a CRS-based transmission scheme, where the CRS-based transmission scheme may be a CRS-based single antenna port transmission scheme or a CRS-based transmit diversity scheme.

Step 4b: The eNodeB transmits, according to the determined transmission scheme of the physical downlink shared channel, the physical downlink shared channel in a resource indicated by the downlink control information carried on the physical downlink control channel.

In this step, the eNodeB determines a transmission mode of the PDSCH according to the transmission scheme of the physical downlink shared channel that is determined in step 3b, and then transmits the physical downlink shared channel in the resource indicated by the downlink control information carried on the physical downlink control channel in step 2b.

In the solution of the present invention, when format 1C or 1A is used for scheduling in the NCT, the user equipment preferably uses the second resource allocation scheme for resource allocation. Thereby a problem of how to design the transmission scheme of the PDSCH that carries a system information, a paging message, and a random access response in the NCT is solved, and meanwhile, transmission performance of the PDSCH that is scrambled by a C-RNTI and whose corresponding DCI format is format 1A is improved, and system performance is improved.

Total solution 2 includes solution 2 on the UE side and solution 2 on the eNodeB side.

Solution 2 on the UE side includes the following steps 1c to 3c.

Step 1c: A user equipment detects a downlink control channel for scheduling a physical downlink shared channel.

A specific implementation method of this step is similar to that in total solution 1, and is not further described herein.

Step 2c: The user equipment determines a resource allocation scheme of the physical downlink shared channel.

In this step, the user equipment determines the resource allocation scheme of the physical downlink shared channel. Specifically, implementation manners of this step may include the following possible implementation methods.

Manner 1: The user equipment determines the resource allocation scheme of the physical downlink shared channel based on a downlink control information format of the downlink control channel and an attribute of a carrier for carrying the physical downlink shared channel.

For the detailed description of this step, reference may be made to step 2a in total solution 1, and no further description is provided herein.

Manner 2: The user equipment determines the resource allocation scheme of the physical downlink shared channel based on a downlink control information format of the downlink control channel.

A difference between manner 2 and manner 1 lies in that, in manner 2, the resource allocation scheme of the physical downlink shared channel does not need to be determined further according to the attribute of the carrier for carrying the physical downlink shared channel. In this case, a correspondence between each downlink control information format and a specific resource allocation scheme may be specifically as follows:

If the downlink control information format of the downlink control channel is format 1A, and a value of a contiguous/distributed VRB assignment flag in format 1A is 1, the resource allocation scheme corresponding to distributed VRBs in resource allocation type 2; if the downlink control information format of the downlink control channel is format 1A, and a value of a contiguous/distributed VRB assignment flag in format 1A is 0, the resource allocation scheme of the physical downlink shared channel is a resource allocation scheme corresponding to localized VRBs in resource allocation type 2;

if the downlink control information format of the downlink control channel is format 1C, the resource allocation scheme of the physical downlink shared channel is a manner of distributed VRBs in resource allocation type 2; or if the downlink control information format of the downlink control channel is a first DCI format, the resource allocation scheme of the physical downlink shared channel is a manner of localized VRBs in resource allocation type 2, or the resource allocation scheme of the physical downlink shared channel is resource allocation type 0, or the resource allocation scheme of the physical downlink shared channel is resource allocation type 1, or the resource allocation scheme of the physical downlink shared channel is a second resource allocation scheme, where the first DCI format and the second resource allocation scheme are the same as those described in total solution 1, and are not further described herein.

Step 3c: The user equipment determines a transmission scheme of the physical downlink shared channel based on a downlink control information format of the downlink control channel and an attribute of a carrier for carrying the physical downlink shared channel.

Specifically, this step may further include the following two steps:

Step 3c-1: The user equipment determines the attribute of the carrier for carrying the physical downlink shared channel.

Specific implementation of this step is the same as that described in step 2a-1 in total solution 1, and is not further described herein.

Step 3c-2: The user equipment determines the transmission scheme of the physical downlink shared channel based on the downlink control information format of the downlink control channel and the attribute of the carrier for carrying the physical downlink shared channel.

In this step, the user equipment determines the transmission scheme of the physical downlink shared channel according to different DCI formats and the attribute of the carrier for carrying the physical downlink shared channel. Specifically, for PDSCHs scrambled by different RNTIs, an implementation method of this step may vary. Specifically, this step may be described according to the following cases:

Case 1: CRC on the downlink control channel corresponding to the PDSCH is scrambled by a C-RNTI.

In this case, the UE is configured to decode the downlink control channel on which CRC is scrambled by the C-RNTI. In this case, implementation manners of this step may include the following implementation methods:

Manner 1: If the downlink control information format of the downlink control channel is format 1A, and the carrier for carrying the physical downlink shared channel is of a new carrier type, the transmission scheme of the physical downlink shared channel is a random beamforming scheme based on DMRS antenna port 7 and antenna port 9; or if the downlink control information format of the downlink control channel is format 1A, and the carrier for carrying the physical downlink shared channel is a backward-compatible carrier, the transmission allocation scheme of the physical downlink shared channel is a CRS-based transmit diversity or a single antenna port scheme based on CRS antenna port 0 or a single antenna port scheme based on DMRS antenna port 7.

In this manner, the random beamforming scheme based on DMRS antenna port 7 and antenna port 9 may be replaced with a DMRS-based transmit diversity scheme. That is, in this case, the transmission scheme corresponding to DCI format 1A in the new carrier type is the DMRS-based transmit diversity scheme. In this manner, for a backward-compatible carrier type, DCI format 1A may be corresponding to multiple transmission schemes. Which manner is specifically used may be determined according to a configured transmission mode and a CRS antenna port corresponding to a physical broadcast channel (Physical Broadcast Channel, PBCH for short), and is not further described herein.

Manner 2: If the downlink control information format of the downlink control channel is format 1A, and a transmission mode configured for the carrier for carrying the physical downlink shared channel is a first transmission mode, the transmission scheme of the physical downlink shared channel is a random beamforming scheme based on DMRS antenna port 7 and antenna port 9; or if the downlink control information format of the downlink control channel is format 1A, and a transmission mode configured for the carrier for carrying the physical downlink shared channel is one of transmission modes 1 to 10, the transmission allocation scheme of the physical downlink shared channel is a CRS-based transmit diversity or a single antenna port scheme based on CRS antenna port 0 or a single antenna port scheme based on DMRS antenna port 7; where the first transmission mode is a transmission mode other than transmission mode 1 to transmission mode 10, for example, the first transmission mode is transmission mode 11.

In this manner, the random beamforming scheme based on DMRS antenna port 7 and antenna port 9 may be replaced with a DMRS-based transmit diversity scheme. That is, in this case, the transmission scheme corresponding to DCI format 1A in the new carrier type is the DMRS-based transmit diversity scheme. The rest is the same as that described in manner 1, and is not further described herein.

Manner 3: If the downlink control information format of the downlink control channel is format 1A, and a transmission mode configured for the carrier for carrying the physical downlink shared channel is a first transmission mode, the transmission allocation scheme of the physical downlink shared channel is a single antenna port scheme based on DMRS antenna port 7; or if the downlink control information format of the downlink control channel is a first DCI format, and a transmission mode configured for the carrier for carrying the physical downlink shared channel is a first transmission mode, the transmission scheme of the physical downlink shared channel is a random beamforming scheme based on DMRS antenna port 7 and antenna port 9; where the first DCI format is any one DCI format except formats 0, 1, 1A, 1B, 1C, 1D, 2, 2A, 2B, 2C, 2D, 3, 3A, and 4.

In this manner, the random beamforming scheme based on DMRS antenna port 7 and antenna port 9 may be replaced with a DMRS-based transmit diversity scheme. That is, in this case, the transmission scheme corresponding to format 1A in the new carrier type is the DMRS-based transmit diversity scheme. The first transmission mode is the same as that described in manner 2, and the rest is the same as that described in manner 1, and therefore no further description is provided herein.

Manner 4: If the downlink control information format of the downlink control channel is format 1A, the transmission allocation scheme of the physical downlink shared channel is a single antenna port scheme based on DMRS antenna port 7; or if the downlink control information format of the downlink control channel is a first DCI format, the transmission scheme of the physical downlink shared channel is a random beamforming scheme based on DMRS antenna port 7 and antenna port 9; where the first DCI format is any one DCI format except formats 0, 1, 1A, 1B, 1C, 1D, 2, 2A, 2B, 2C, 2D, 3, 3A, and 4.

Manner 5: If the downlink control information format of the downlink control channel is format 1A, and a value of a contiguous/distributed VRB assignment flag in the DCI format is 0, and a transmission mode configured for the carrier for carrying the physical downlink shared channel is a first transmission mode, the transmission allocation scheme of the physical downlink shared channel is a single antenna port scheme based on DMRS antenna port 7; or if the downlink control information format of the downlink control channel is format 1A, and a value of a contiguous/distributed VRB assignment flag in the DCI format is 1, and a transmission mode configured for the carrier for carrying the physical downlink shared channel is a first transmission mode, the transmission scheme of the physical downlink shared channel is a random beamforming scheme based on DMRS antenna port 7 and antenna port 9.

In this manner, the random beamforming scheme based on DMRS antenna port 7 and antenna port 9 may be replaced with a DMRS-based transmit diversity scheme, or may be replaced with a random beamforming scheme based on DMRS antenna port 7 and antenna port 8. In addition, the resource allocation scheme of the PDSCH in this manner may be always a resource allocation scheme corresponding to distributed VRBs in resource allocation type 2. In addition, values of the contiguous/distributed VRB assignment flag in the DCI in the determining condition in this manner may be interchanged. For example, the value 1 of the contiguous/distributed VRB assignment flag in the DCI format is corresponding to a single antenna port scheme based on DMRS antenna port 7.

Manner 6: If the downlink control information format of the downlink control channel is format 1A, and a value of a contiguous/distributed VRB assignment flag in the DCI format is 0, and the carrier for carrying the physical downlink shared channel is of a new carrier type, the transmission allocation scheme of the physical downlink shared channel is a single antenna port scheme based on DMRS antenna port 7; or if the downlink control information format of the downlink control channel is format 1A, and a value of a contiguous/distributed VRB assignment flag in the DCI format is 1, and the carrier for carrying the physical downlink shared channel is of a new carrier type, the transmission scheme of the physical downlink shared channel is a random beamforming scheme based on DMRS antenna port 7 and antenna port 9.

The rest in this manner is the same as that described in manner 4, and is not further described herein.

It should be noted that, the description of case 1 is applicable to cases in which CRC on the downlink control channel corresponding to the PDSCH is scrambled by an SPS C-RNTI, an SI-RNTI, a P-RNTI, an RA-RNTI, and a Temporary C-RNTI.

Case 2: CRC on the downlink control channel corresponding to the PDSCH is scrambled by an SI-RNTI.

In this case, the UE is configured to decode the downlink control channel on which CRC is scrambled by the SI-RNTI. In this case, this step may include the following possible implementation manners:

Manner 1: If the downlink control information format of the downlink control channel is format 1C, and the carrier for carrying the physical downlink shared channel is of a new carrier type, the transmission allocation scheme of the physical downlink shared channel is a random beamforming scheme based on DMRS antenna port 7 and antenna port 9; or if the downlink control information format of the downlink control channel is format 1C, and the carrier for carrying the physical downlink shared channel is a backward-compatible carrier, the transmission allocation scheme of the physical downlink shared channel is a CRS-based transmit diversity or a single antenna port scheme based on CRS antenna port 0 or a single antenna port scheme based on DMRS antenna port 7.

The rest is the same as that described in manner 1 of case 1, and is not further described herein.

Manner 2: If the downlink control information format of the downlink control channel is format 1C, and a transmission mode configured for the carrier for carrying the physical downlink shared channel is a first transmission mode, the transmission scheme of the physical downlink shared channel is a random beamforming scheme based on DMRS antenna port 7 and antenna port 9.

In this manner, the random beamforming scheme based on DMRS antenna port 7 and antenna port 9 may be replaced with a DMRS-based transmit diversity scheme. That is, in this case, the transmission scheme corresponding to format 1A in the new carrier type is the DMRS-based transmit diversity scheme. The rest is the same as that described in manner 1, and is not further described herein. The first transmission mode is the same as that in manner 2 of step 2a in total solution 1, and is not further described herein.

Manner 3: If the downlink control information format of the downlink control channel is format 1C, and a transmission mode configured for the carrier for carrying the physical downlink shared channel is a first transmission mode, the transmission allocation scheme of the physical downlink shared channel is a single antenna port scheme based on DMRS antenna port 7; or if the downlink control information format of the downlink control channel is a first DCI format, and a transmission mode configured for the carrier for carrying the physical downlink shared channel is a first transmission mode, the transmission scheme of the physical downlink shared channel is a random beamforming scheme based on DMRS antenna port 7 and antenna port 9; where the first DCI format is any one DCI format except formats 0, 1, 1A, 1B, 1C, 1D, 2, 2A, 2B, 2C, 2D, 3, 3A, and 4.

In this manner, the random beamforming scheme based on DMRS antenna port 7 and antenna port 9 may be replaced with a DMRS-based transmit diversity scheme. That is, in this case, the transmission scheme corresponding to DCI format 1A in the new carrier type is the DMRS-based transmit diversity scheme. The first transmission mode is the same as that described in manner 2, and the rest is the same as that described in manner 1, and therefore no further description is provided herein.

Manner 4: If the downlink control information format of the downlink control channel is format 1C, the transmission allocation scheme of the physical downlink shared channel is a single antenna port scheme based on DMRS antenna port 7; or if the downlink control information format of the downlink control channel is a first DCI format, the transmission scheme of the physical downlink shared channel is a random beamforming scheme based on DMRS antenna port 7 and antenna port 9; where the first DCI format is any one DCI format except formats 0, 1, 1A, 1B, 1C, 1D, 2, 2A, 2B, 2C, 2D, 3, 3A, and 4.

Step 4c: The user equipment decodes the physical downlink shared channel based on the resource allocation scheme determined in step 2c and the transmission scheme determined in step 3c.

In this step, the user equipment determines, based on the resource allocation scheme determined in step 2c and a resource block allocation indication indicated in the DCI format, a physical resource allocated to the PDSCH, and decodes the PDSCH in the determined physical resource according to the transmission scheme determined in step 3c.

Solution 2 on the eNodeB side includes the following steps 1d to 2d.

Step 1d: A eNodeB determines a transmission scheme of a physical downlink shared channel.

In this step, an implementation manner is that the eNodeB determines the transmission scheme of the physical downlink shared channel based on a downlink control information format of a downlink control channel for scheduling the physical downlink shared channel and an attribute of a carrier for carrying the physical downlink shared channel. In this case, the method for determining the transmission scheme of the physical downlink shared channel by the eNodeB in this step is the same as that described in step 3c-2, and is not further described herein.

Step 2d: The eNodeB transmits the physical downlink shared channel according to the determined transmission scheme of the physical downlink shared channel.

In this step, the eNodeB determines a transmission mode of the PDSCH according to the transmission scheme of the physical downlink shared channel that is determined in step 1d, and then transmits the physical downlink shared channel in a resource that is scheduled for the PDSCH.

In the solution of the present invention, by introducing a new DCI format (namely, the first DCI format) and the second resource allocation scheme, or using the second resource allocation scheme when DCI format 1C is used for scheduling, a problem of how to design the transmission scheme of the PDSCH that carries system information, a paging message, and a random access response in an NCT is solved, and meanwhile, by introducing a transmission scheme with better transmission performance such as an RBF transmission scheme based on DMRS antenna port 7 and antenna port 9 or a DMRS-based transmit diversity transmission scheme in the carrier of the new carrier type, transmission performance of the PDSCH in the new carrier type is improved.

Total solution 3 includes solution 3 on the UE side and solution 3 on the eNodeB side.

Solution 3 on the UE side includes the following steps 1e to 3e.

Step 1e: A user equipment detects a downlink control channel for scheduling a physical downlink shared channel.

For specific implementation of this step, reference may be made to step 1a in total solution 1, and no further description is provided herein.

Step 2e: The user equipment determines a transmission scheme of the physical downlink shared channel according to an attribute of a carrier for carrying the PDSCH.

When the carrier for carrying the PDSCH is of a new carrier type, this step includes the following possible implementation manners:

Manner 1: If a subframe for carrying the physical downlink shared channel is a first subframe, the transmission scheme of the physical downlink shared channel is a single antenna port scheme based on DMRS antenna port 7; or if a subframe for carrying the physical downlink shared channel is a second subframe, the transmission scheme of the physical downlink shared channel is a DMRS-based transmit diversity scheme.

The first subframe is a subframe carrying a first signal, and the second subframe is a subframe not carrying the first signal, where the first signal is a CSI-RS and/or a CRS and/or a PSS/SSS and/or a DRS (Discovery reference signal) and/or a broadcast channel, where the broadcast channel includes a physical broadcast channel PBCH or an enhanced physical broadcast channel (Enhanced Physical Broadcast Channel, EPBCH for short); or the second subframe is a subframe for transmitting only the PDSCH and a DMRS, and the first subframe is any other subframe; or the first subframe is an MBSFN subframe, and the second subframe is a non-MBSFN subframe.

In manner 1, the DMRS-based transmit diversity scheme is used only in the second subframe, and the second subframe does not carry the first signal, so that an orphan resource element (Resource Element, RE for short) problem is not severe or does not exist when the DMRS-based transmit diversity scheme is used. Therefore, on the one hand, the standard becomes simpler, and on the other hand, transmission performance of the PDSCH is improved by using the DMRS-based transmit diversity scheme in the second subframe.

Manner 2: If a bandwidth for carrying the physical downlink shared channel completely or partly overlaps a bandwidth for carrying a first signal, the transmission scheme of the physical downlink shared channel is a single antenna port scheme based on DMRS antenna port 7; or if a bandwidth for carrying the physical downlink shared channel does not overlap a bandwidth for carrying a first signal, the transmission scheme of the physical downlink shared channel is a DMRS-based transmit diversity.

In this manner, the first signal is the same as that described in manner 1, and is not further described herein. In this manner, the user equipment may first determine, based on downlink control information carried on the downlink control channel detected in step 1e, the bandwidth for transmitting the physical downlink shared channel, and then determine the transmission scheme of the physical downlink shared channel according to this manner. In this manner, the bandwidth for carrying the physical downlink shared channel may refer to a PRB pair for carrying the physical downlink shared channel, and the bandwidth for carrying the first signal may also refer to a PRB pair for carrying the first signal.

In manner 2, the DMRS-based transmit diversity is used only when the bandwidth for carrying the physical downlink shared channel does not overlap the bandwidth for carrying the first signal, so that an orphan RE problem is not severe or does not exist when the DMRS-based transmit diversity scheme is used. Therefore, on the one hand, the standard becomes simpler, and on the other hand, the DMRS-based transmit diversity is used in as many cases as possible, and transmission performance of the PDSCH is improved.

Step 3e: The user equipment decodes the PDSCH based on DCI carried on the downlink control channel and the transmission scheme of the PDSCH.

In this step, the user equipment determines, based on the DCI carried on the downlink control channel detected in step 1e, a physical resource allocated to the PDSCH, and decodes the PDSCH in the determined physical resource according to the transmission scheme determined in step 3e.

Solution 3 on the eNodeB side includes the following steps 1f to 3f.

Step 1f: A eNodeB transmits a downlink control channel for scheduling a physical downlink shared channel.

In an embodiment of the present invention, the downlink control channel may be an EPDCCH or a PDCCH. The downlink control channel in this step is used for scheduling the physical downlink shared channel. In an LTE system, DCI carried on the downlink control channel is used to indicate downlink or uplink scheduling information, where the DCI used to indicate downlink scheduling information may be in multiple DCI formats.

Step 2f: The eNodeB determines a transmission scheme of the physical downlink shared channel.

This step includes the following possible implementation manners.

Manner 1: If a subframe for carrying the physical downlink shared channel is a first subframe, the transmission scheme of the physical downlink shared channel is a single antenna port scheme based on DMRS antenna port 7; or if a subframe for carrying the physical downlink shared channel is a second subframe, the transmission scheme of the physical downlink shared channel is a DMRS-based transmit diversity.

The first subframe and the second subframe are the same as those described in manner 1 of step 2e, and are not further described herein.

Manner 2: If a bandwidth for carrying the physical downlink shared channel completely or partly overlaps a bandwidth for carrying a first signal, the transmission scheme of the physical downlink shared channel is a single antenna port scheme based on DMRS antenna port 7; or if a bandwidth for carrying the physical downlink shared channel does not overlap a bandwidth for carrying a first signal, the transmission scheme of the physical downlink shared channel is a DMRS-based transmit diversity.

In this manner, the first signal is the same as that described in manner 1 of step 2e, and is not further described herein. In this manner, the eNodeB may first determine, based on a scheduling policy, the bandwidth for transmitting the physical downlink shared channel, and then determine the transmission scheme of the physical downlink shared channel according to this manner. In this manner, the bandwidth for carrying the physical downlink shared channel may refer to a PRB pair for carrying the physical downlink shared channel, and the bandwidth for carrying the first signal may also refer to a PRB pair for carrying the first signal.

Step 3f: The eNodeB transmits, according to the determined transmission scheme of the physical downlink shared channel, the physical downlink shared channel in a resource indicated by downlink control information carried on the physical downlink control channel.

In this step, the eNodeB determines a transmission mode of the PDSCH according to the transmission scheme of the physical downlink shared channel that is determined in step 2f, and then transmits the physical downlink shared channel in the resource indicated by the downlink control information carried on the physical downlink control channel.

In the present invention, a single antenna port transmission scheme based on DMRS antenna port 7 is used in the first subframe, and a DMRS-based transmit diversity is used in the second subframe, or a DMRS-based transmit diversity is used when the bandwidth for the physical downlink shared channel does not overlap the bandwidth for carrying the first signal, and a DMRS-based single antenna port is used when the bandwidth for the physical downlink shared channel overlaps the bandwidth for carrying the first signal, so that an orphan RE problem is not severe or does not exist when the DMRS-based transmit diversity scheme is used. Therefore, on the one hand, the standard becomes simpler, and on the other hand, the DMRS-based transmit diversity scheme is used in as many cases as possible, and transmission performance of the PDSCH is improved.

Total solution 4 includes solution 4 on the UE side.

Solution 4 on the UE side includes the following steps 1g to 3g.

Step 1g: A user equipment detects a downlink control channel for scheduling a physical downlink shared channel.

For specific implementation of this step, reference may be made to step 1a in total solution 1, and no further description is provided herein.

Step 2g: The user equipment determines a resource allocation scheme of the physical downlink shared channel based on a downlink control information format of the downlink control channel.

In this step, the user equipment may specifically further determine the resource allocation scheme of the physical downlink shared channel with reference to an attribute of a carrier for carrying the physical downlink shared channel. In this case, this step is that the user equipment determines the resource allocation scheme of the physical downlink shared channel based on the downlink control information format of the downlink control channel and the attribute of the carrier for carrying the physical downlink shared channel.

In this case, specifically, this step may further include the following two steps:

Step 2g-1: The user equipment determines the attribute of the carrier for carrying the physical downlink shared channel.

For specific implementation of this step, reference may be made to step 2a-1 in total solution 1, and no further description is provided herein.

Step 2g-2: The user equipment determines the resource allocation scheme of the physical downlink shared channel based on the downlink control information format of the downlink control channel and the attribute of the carrier for carrying the physical downlink shared channel.

This step includes the following possible implementation manners.

Manner 1: If the downlink control information format of the downlink control channel is format 1A, and a value of a contiguous/distributed VRB assignment flag in the DCI format is 0, and the carrier for carrying the physical downlink shared channel is of a new carrier type, the resource allocation scheme of the physical downlink shared channel is resource allocation type 0; or if the downlink control information format of the downlink control channel is format 1A, and a value of a contiguous/distributed VRB assignment flag in the DCI format is 1, and the carrier for carrying the physical downlink shared channel is of a new carrier type, the resource allocation scheme of the physical downlink shared channel is resource allocation type 1; and in the DCI, a bit quantity used to indicate RB allocation according to resource allocation type 0 or used to indicate RB allocation according to resource allocation type 1 is consistent with a bit quantity used to indicate RB allocation according to resource allocation type 2.

In this manner, in the DCI, the bit quantity used to indicate resource block allocation according to resource allocation type 0 or used to indicate resource block allocation according to resource allocation type 1 is consistent with the bit quantity used to indicate resource block allocation according to resource allocation type 2. Specifically, this may be implemented by scheduling the UE in only some PRB pairs. By using a bandwidth B (which may also be described as a quantity of PRB pairs) of the some PRB pairs, the required bit quantity used for scheduling the UE in the some PRB pairs according to resource allocation type 0 or resource allocation type 1 is consistent with the required bit quantity used for scheduling in all PRB pairs according to resource allocation type 2. Specifically, a system bandwidth $N_{RB}^{DL}$ is substituted into the following equation, and a size P' of an RBG corresponding to the bandwidth of the some PRB pairs is obtained. Then obtained P' is substituted into Table 2, and a system bandwidth range corresponding to P' is obtained. A largest value in the range is used as the bandwidth of the some PRB pairs.

$$\lceil N_{RB}^{DL}/P' \rceil = \lceil \log_2(N_{RB}^{DL}(N_{RB}^{DL}+1)/2) \rceil$$

TABLE 2

| System bandwidth $N_{RB}^{DL}$ | RBG size P |
| --- | --- |
| ≤10 | 1 |
| 11-26 | 2 |
| 27-63 | 3 |
| 64-110 | 4 |

In this manner, "and the carrier for carrying the physical downlink shared channel is of a new carrier type" may be replaced with "and a transmission mode configured for the carrier for carrying the physical downlink shared channel is a first transmission mode". That is, if the downlink control information format of the downlink control channel is format 1A, and a value of a contiguous/distributed VRB assignment flag in the DCI format is 0, and a transmission mode configured for the carrier for carrying the physical downlink shared channel is a first transmission mode, the resource allocation scheme of the physical downlink shared channel is resource allocation type 0; or if the downlink control information format of the downlink control channel is format 1A, and a value of a contiguous/distributed VRB assignment flag in the DCI format is 1, and a transmission mode configured for the carrier for carrying the physical downlink shared channel is a first transmission mode, the resource allocation scheme of the physical downlink shared channel is resource allocation type 1; and in the DCI, the bit quantity used to indicate RB allocation according to resource allocation type 0 or used to indicate RB allocation according to resource allocation type 1 is consistent with the bit quantity used to indicate resource block allocation according to resource allocation type 2.

The some PRB pairs in this manner may be contiguous, or may be distributed. For example, the some PRB pairs in this manner may be B PRB pairs in a center of the entire system bandwidth, or may be B contiguous PRB pairs starting from a position in which a PRB number of a PRB pair is 0 in the system bandwidth or B contiguous PRB pairs starting a position in which of a PRB pair number is $N_{RB}^{DL}-B$ in the system bandwidth. Alternatively, the system bandwidth may be divided into multiple subsets, and the some PRB pairs is one of the multiple subsets.

Manner 2: If the downlink control information format of the downlink control channel is format 1A, and the carrier for carrying the physical downlink shared channel is of a new carrier type, the resource allocation scheme of the physical downlink shared channel is resource allocation type 0, and in the DCI format 1A, a bit quantity used to indicate resource block allocation according to resource allocation type 0 is consistent with a bit quantity used to indicate resource block allocation according to resource allocation type 2.

In this manner, in DCI format 1A, the bit quantity used to indicate resource block allocation according to resource allocation type 0 or used to indicate resource block allocation according to resource allocation type 1 is consistent with the bit quantity used to indicate resource block allocation according to resource allocation type 2. Specifically, this may be implemented by scheduling the UE in only some PRB pairs. By using a bandwidth B (namely, a quantity of PRB pairs) of the some PRB pairs, the required bit quantity used for scheduling the UE in the some PRB pairs according to resource allocation type 0 or resource allocation type 1 is consistent with the required bit quantity used for scheduling in all PRB pairs according to resource allocation type 2. Specifically, the bandwidth of the some PRB pairs may be obtained by using the following equation and Table 2. The specific process is similar to that in manner 1, and is not further described herein.

$$\lceil N_{RB}^{DL}/P \rceil = \lceil \log_2(N_{RB}^{DL}(N_{RB}^{DL}+1)/2) \rceil + 1$$

Resource allocation type 0 in this manner may be replaced with resource allocation type 1, that is, resource allocation type 0 in the foregoing determining condition may be replaced with resource allocation type 1. Specifically, if the downlink control information format of the downlink control channel is format 1A, and the carrier for carrying the physical downlink shared channel is of the new carrier type, the resource allocation scheme of the physical downlink shared channel is resource allocation type 1, and in DCI format 1A, the bit quantity used to indicate resource block allocation according to resource allocation type 1 is consistent with the bit quantity used to indicate resource block allocation according to resource allocation type 2.

Further, "and the carrier for carrying the physical downlink shared channel is of a new carrier type" in this manner may be replaced with "and a transmission mode configured for the carrier for carrying the physical downlink shared channel is a first transmission mode". That is, "and the carrier for carrying the physical downlink shared channel is of a new carrier type" in the foregoing determining condition may be replaced with "and a transmission mode configured for the carrier for carrying the physical downlink shared channel is a first transmission mode".

It should be noted that, format 1A in manner 2 may be replaced with format 1C. That is, in all cases relating to format 1A in this manner, format 1A may be placed with format 1C, and other descriptions remain unchanged, and no further description is provided herein.

In step 2g, the user equipment may further determine the resource allocation scheme of the physical downlink shared channel only based on the downlink control information format of the downlink control channel. In this case, this step includes the following possible implementation manners.

Manner 1: If the downlink control information format of the downlink control channel is a first DCI format, the resource allocation scheme of the physical downlink shared channel is resource allocation type 0, and the first DCI format is any one DCI format except formats 0, 1, 1A, 1B, 1C, 1D, 2, 2A, 2B, 2C, 2D, 3, 3A, and 4.

A bit quantity in the first DCI format may be the same as a bit quantity in format 1A. Specifically, in the DCI of the first DCI format, the bit quantity used to indicate RB allocation according to resource allocation type 0 is consistent with the bit quantity used to indicate RB allocation according to resource allocation type 2.

The first DCI format may include a field for distinguishing between format 1A and the first DCI format. The field may reuse a contiguous/distributed VRB assignment flag in format 1A as an indication, that is, in the first DCI format, a field for indicating a contiguous/distributed VRB assignment flag in original format 1A is used for distinguishing between format 1A and the first DCI format.

Resource allocation type 0 in this manner may be replaced with resource allocation type 1. In addition, "and the carrier for carrying the physical downlink shared channel is of a new carrier type" in this manner may be replaced with "and a transmission mode configured for the carrier for carrying the physical downlink shared channel is a first transmission mode". It should be noted that, format 1A in manner 1 may be replaced with format 1C.

Manner 2: If the downlink control information format of the downlink control channel is a first DCI format, and a value of a resource allocation header (resource allocation header) in the first DCI format is 0, the resource allocation scheme of the physical downlink shared channel is resource allocation type 0; or if the downlink control information format of the downlink control channel is a first DCI format, and a value of a resource allocation header in the first DCI format is 1, the resource allocation scheme of the physical downlink shared channel is resource allocation type 1, and the first DCI format is any one DCI format except format 0/1/1A/1B/1C/1D/2/2A/2B/2C/2D/3/3A/4.

A payload size in the first DCI format is the same as a bit quantity in format 1A. That is, in the first DCI format, the bit quantity used to indicate resource block allocation according to resource allocation type 0 or used to indicate resource block allocation according to resource allocation type 1 is consistent with the bit quantity used to indicate resource block allocation according to resource allocation type 2. In the first DCI format, one bit used for distinguishing between format 1A and format 0 in the original format 1A is used for distinguishing between format 1A and the first DCI format.

The first DCI format may not be any one DCI format in the existing LTE system, for example, may be a newly introduced DCI format, such as format 1E or format 1A'.

Resource allocation type 0 in this manner may be replaced with resource allocation type 1.

Step 3g: The user equipment decodes the physical downlink shared channel based on the resource allocation scheme.

In this step, the user equipment determines, based on the resource allocation scheme determined in step 2g and a resource block allocation indication indicated in the DCI format, a physical resource allocated to the PDSCH, and thereby decodes the PDSCH in the determined physical resource. This step further includes that the user equipment decodes the physical downlink shared channel based on the resource allocation scheme and a DMRS-based transmission scheme. The DMRS-based transmission scheme may be a single antenna port transmission scheme based on DMRS antenna port 7, or a transmit diversity transmission scheme based on DMRS antenna port 7 and antenna port 9, or a random beamforming scheme based on DMRS antenna port 7 and antenna port 9, or a transmit diversity scheme based on DMRS antenna port 7 and antenna port 8, or a transmit diversity scheme based on DMRS antenna ports 7/8/9/10. In the present invention, the single antenna port transmission scheme based on DMRS antenna port 7 is preferred, so that efforts for standardization due to necessity of defining other transmission schemes may be reduced.

In the solution of the present invention, by modifying a resource allocation scheme corresponding to format 1A, or introducing a new first DCI format, a problem of how to design the transmission scheme of the PDSCH that carries system information, a paging message, and a random access response in an NCT is solved, and meanwhile, by using a distributed resource allocation scheme based on DMRS antenna port 7 in the new carrier type, transmission performance of the PDSCH in the new carrier type is improved.

Figure 7:
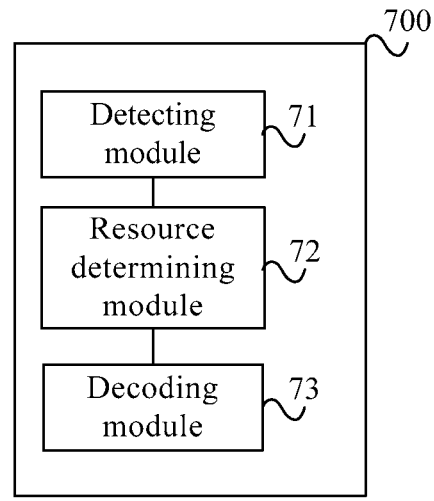
FIG. 7 is a schematic structural diagram of a PDSCH transmission apparatus 700 according to Embodiment 5 of the present invention.

FIG. 7 is a schematic structural diagram of a PDSCH transmission apparatus 700 according to Embodiment 5 of the present invention. As shown in FIG. 7, the apparatus includes:

a detecting module 71, configured to detect a downlink control channel for scheduling a PDSCH;

a resource determining module 72, configured to determine a resource allocation scheme of the PDSCH according to a downlink control information DCI format of the downlink control channel for scheduling the PDSCH and an attribute of a carrier for carrying the PDSCH; and a decoding module 73, configured to decode the PDSCH according to the resource allocation scheme of the PDSCH and a transmission scheme of the PDSCH.

Optionally, the attribute includes a carrier type; and the resource determining module 72 is specifically configured to:

if the DCI format of the downlink control channel is format 1A, and the carrier for carrying the PDSCH is of a new carrier type, and a value of a virtual resource block VRB assignment flag in the DCI format is 1, determine that the resource allocation scheme of the PDSCH is resource allocation type 2 and that a VRB to physical resource block PRB mapping mechanism in any one timeslot is consistent with a VRB to PRB mapping mechanism in an even timeslot in a case of distributed VRBs in Long Term Evolution LTE Release 11.

Optionally, the attribute includes a carrier type; and the resource determining module 72 is specifically configured to:

if the DCI format of the downlink control channel is format 1A, and the carrier for carrying the PDSCH is a backward-compatible carrier, and a value of a VRB assignment flag in the DCI format is 1, determine that the resource allocation scheme of the PDSCH is a first resource allocation scheme; or if the DCI format of the downlink control channel is format 1A, and the carrier for carrying the PDSCH is of a new carrier type, and a value of a VRB assignment flag in the DCI format is 1, determine that the resource allocation scheme of the PDSCH is a second resource allocation scheme;

where the first resource allocation scheme is a resource allocation scheme corresponding to distributed VRBs in resource allocation type 2 in LTE Release 11, and VRB to PRB mapping mechanisms of the second resource allocation scheme and the first resource allocation scheme are not exactly the same.

Optionally, the second resource allocation scheme is resource allocation type 2, and a VRB to PRB mapping mechanism in any one timeslot is consistent with a VRB to PRB mapping mechanism in an even timeslot in a case of distributed VRBs in LTE Release 11.

Optionally, the attribute includes a transmission mode; and the resource determining module 72 is specifically configured to:

if the DCI format of the downlink control channel is format 1A, and a value of a VRB assignment flag in the DCI format is 1, and a transmission mode of the carrier for carrying the PDSCH is transmission mode x, where x is an integer greater than 10, determine that the resource allocation scheme of the PDSCH is resource allocation type 2, and that a VRB to PRB mapping mechanism in any one timeslot is consistent with a VRB to PRB mapping mechanism in an even timeslot in a case of distributed VRBs in LTE Release 11.

Optionally, the attribute includes a carrier type; and the resource determining module 72 is specifically configured to:

if the DCI format of the downlink control channel is format 1C, and the carrier for carrying the PDSCH is of a new carrier type, determine that the resource allocation scheme of the PDSCH is resource allocation type 2 and that a VRB to PRB mapping mechanism in any one timeslot is consistent with a VRB to PRB mapping mechanism in an even timeslot in a case of distributed VRBs in LTE Release 11.

Optionally, the attribute includes a transmission mode; and the resource determining module 72 is specifically configured to:

if the DCI format of the downlink control channel is format 1C, and a transmission mode configured for the carrier for carrying the PDSCH is transmission mode x, where x is an integer greater than 10, determine that the resource allocation scheme of the PDSCH is resource allocation type 2, and that a VRB to PRB mapping mechanism in any one timeslot is consistent with a VRB to PRB mapping mechanism in an even timeslot in a case of distributed VRBs in LTE Release 11.

Optionally, the attribute includes a carrier type; and the resource determining module 72 is specifically configured to:

if the DCI format of the downlink control channel is a DCI format corresponding to resource allocation type 2, and the carrier for carrying the PDSCH is of a new carrier type, determine that the resource allocation scheme of the PDSCH is resource allocation type 2 and that a VRB to PRB mapping mechanism in any one timeslot is consistent with a VRB to PRB mapping mechanism in an even timeslot in a case of distributed VRBs in LTE Release 11.

Optionally, the attribute includes a transmission mode; and the resource determining module 72 is specifically configured to:

if the DCI format of the downlink control channel is a DCI format corresponding to resource allocation type 2, and a transmission mode configured for the carrier for carrying the PDSCH is transmission mode x, where x is an integer greater than 10, determine that the resource allocation scheme of the PDSCH is resource allocation type 2 and that a VRB to PRB mapping mechanism in any one timeslot is consistent with a VRB to PRB mapping mechanism in an even timeslot in a case of distributed VRBs in LTE Release 11.

Optionally, the attribute includes a transmission mode; and the resource determining module 72 is specifically configured to:

if the DCI format of the downlink control channel is format 1A, and a transmission mode of the carrier for carrying the PDSCH is transmission mode x, where x is an integer greater than 10, determine that the resource allocation scheme of the PDSCH is resource allocation type 0 and that a bit quantity used to indicate resource block allocation according to resource allocation type 0 in the DCI is consistent with a bit quantity used to indicate resource block allocation according to resource allocation type 2 in the DCI.

Further, the apparatus 700 further includes:

a first transmission determining module, configured to determine the transmission scheme of the PDSCH according to the DCI format of the downlink control channel for scheduling the PDSCH and the attribute of the carrier for carrying the PDSCH.

Optionally, the attribute includes a carrier type; and the first transmission determining module is specifically configured to:

if the DCI format of the downlink control channel is format 1A, and the carrier for carrying the PDSCH is of a new carrier type, determine that the transmission scheme of the PDSCH is a random beamforming scheme based on DMRS antenna port 7 and antenna port 9.

Optionally, the attribute includes a transmission mode; and the first transmission determining module is specifically configured to:

if the DCI format of the downlink control channel is format 1A, and a transmission mode of the carrier for carrying the PDSCH is transmission mode x, where x is an integer greater than 10, determine that the transmission scheme of the PDSCH is a random beamforming scheme based on DMRS antenna port 7 and antenna port 9.

Optionally, the attribute includes a transmission mode; and the first transmission determining module is specifically configured to:

when a transmission mode of the carrier for carrying the PDSCH is transmission mode x, where x is an integer greater than 10, if the DCI format of the downlink control channel is format a, determine that the transmission scheme of the PDSCH is a random beamforming scheme based on DMRS antenna port 7 and antenna port 9 or a DMRS-based transmit diversity scheme, or if the DCI format of the downlink control channel is format 1A, determine that the transmission scheme of the PDSCH is a single antenna port scheme based on DMRS antenna port 7, where format a is any one DCI format except formats 0, 1, 1A, 1B, 1C, 1D, 2, 2A, 2B, 2C, 2D, 3, 3A, and 4.

Optionally, the attribute includes a transmission mode; and the first transmission determining module is specifically configured to:

when the DCI format of the downlink control channel is format 1A, and a transmission mode of the carrier for carrying the PDSCH is transmission mode x, where x is an integer greater than 10, if a value of a VRB assignment flag in the DCI format is 1, determine that the transmission scheme of the PDSCH is a random beamforming scheme based on DMRS antenna port 7 and antenna port 9, a DMRS-based transmit diversity scheme, or a random beamforming scheme based on DMRS antenna port 7 and antenna port 8, or if a value of a VRB assignment flag in the DCI format is 0, determine that the transmission scheme of the PDSCH is a single antenna port scheme based on DMRS antenna port 7.

Optionally, the attribute includes a carrier type; and the first transmission determining module is specifically configured to:

if the DCI format of the downlink control channel is format 1C, and the carrier for carrying the PDSCH is of a new carrier type, determine that the transmission scheme of the PDSCH is a random beamforming scheme based on DMRS antenna port 7 and antenna port 9.

Optionally, the attribute includes a transmission mode; and the first transmission determining module is specifically configured to:

if the DCI format of the downlink control channel is format 1C, and a transmission mode of the carrier for carrying the PDSCH is transmission mode x, where x is an integer greater than 10, determine that the transmission scheme of the PDSCH is a random beamforming scheme based on DMRS antenna port 7 and antenna port 9.

Further, the apparatus 700 further includes:

a second transmission determining module, configured to determine the transmission scheme of the PDSCH according to the DCI format of the downlink control channel for scheduling the PDSCH.

Optionally, the second transmission determining module is specifically configured to:

if the DCI format of the downlink control channel is format a, determine that the transmission scheme of the PDSCH is a random beamforming scheme based on DMRS antenna port 7 and antenna port 9, where format a is any one DCI format except formats 0, 1, 1A, 1B, 1C, 1D, 2, 2A, 2B, 2C, 2D, 3, 3A, and 4.

For specific implementation of this embodiment, reference may be made to the PDSCH transmission method provided by Embodiment 1 of the present invention.

Figure 8:
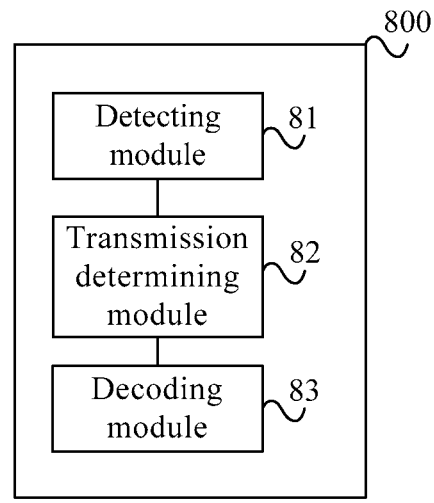
FIG. 8 is a schematic structural diagram of a PDSCH transmission apparatus 800 according to Embodiment 6 of the present invention.

FIG. 8 is a schematic structural diagram of a PDSCH transmission apparatus 800 according to an embodiment of the present invention. As shown in FIG. 8, the apparatus includes:

a detecting module 81, configured to detect a downlink control channel for scheduling a PDSCH;

a transmission determining module 82, configured to determine a transmission scheme of the PDSCH according to an attribute of a carrier for carrying the PDSCH; and a decoding module 83, configured to decode the PDSCH according to the transmission scheme of the PDSCH and a resource allocation scheme of the PDSCH.

Optionally, the attribute includes a carrier type; and the transmission determining module 82 is specifically configured to:

when the carrier for carrying the PDSCH is of a new carrier type, if a subframe for carrying the PDSCH is a first subframe, determine that the transmission scheme of the PDSCH is a single antenna port scheme based on DMRS antenna port 7; or if a subframe for carrying the PDSCH is a second subframe, determine that the transmission scheme of the PDSCH is a DMRS-based transmit diversity scheme.

Specifically, the first subframe is a subframe carrying a first signal, and the second subframe is a subframe not carrying the first signal, where the first signal includes one or more of a CSI-RS, a CRS, a PSS, an SSS, a DRS, and a broadcast channel; or the second subframe is a subframe for transmitting only the PDSCH and a DMRS, and the first subframe is any other subframe than the second subframe; or the first subframe is an MBSFN subframe, and the second subframe is a non-MBSFN subframe.

Optionally, the attribute includes a carrier type; and the transmission determining module 82 is specifically configured to:

when the carrier for carrying the PDSCH is of a new carrier type, if a bandwidth for carrying the PDSCH completely or partly overlaps a bandwidth for carrying a first signal, determine that the transmission scheme of the PDSCH is a single antenna port scheme based on DMRS antenna port 7, or otherwise, determine that the transmission scheme of the PDSCH is a DMRS-based transmit diversity scheme, where the first signal includes one or more of a CSI-RS, a CRS, a PSS, an SSS, a DRS, and a broadcast channel.

Further, the transmission determining module 82 is specifically configured to determine the transmission scheme of the PDSCH according to a DCI format of the downlink control channel for scheduling the PDSCH and the attribute of the carrier for carrying the PDSCH.

Optionally, the attribute includes a carrier type; and the transmission determining module 82 is specifically configured to:

when the DCI format of the downlink control channel is format 1A, if the carrier for carrying the PDSCH is of a new carrier type, determine that the transmission scheme of the PDSCH is a random beamforming scheme based on DMRS antenna port 7 and antenna port 9 or a DMRS-based transmit diversity scheme.

Optionally, the attribute includes a transmission mode; and the transmission determining module 82 is specifically configured to:

when the DCI format of the downlink control channel is format 1A, if a transmission mode of the carrier for carrying the PDSCH is transmission mode x, where x is an integer greater than 10, determine that the transmission scheme of the PDSCH is a random beamforming scheme based on DMRS antenna port 7 and antenna port 9 or a DMRS-based transmit diversity scheme.

Optionally, the attribute includes a transmission mode; and the transmission determining module 82 is specifically configured to:

when a transmission mode of the carrier for carrying the PDSCH is transmission mode x, where x is an integer greater than 10, if the DCI format of the downlink control channel is format a, determine that the transmission scheme of the PDSCH is a random beamforming scheme based on DMRS antenna port 7 and antenna port 9 or a DMRS-based transmit diversity scheme, or if the DCI format of the downlink control channel is format 1A, determine that the transmission scheme of the PDSCH is a single antenna port scheme based on DMRS antenna port 7, where format a is any one DCI format except formats 0, 1, 1A, 1B, 1C, 1D, 2, 2A, 2B, 2C, 2D, 3, 3A, and 4.

Optionally, the attribute includes a transmission mode; and the transmission determining module 82 is specifically configured to:

when the DCI format of the downlink control channel is format 1A, and a transmission mode of the carrier for carrying the PDSCH is transmission mode x, where x is an integer greater than 10, if a value of a VRB assignment flag in the DCI format is 1, determine that the transmission scheme of the PDSCH is a random beamforming scheme based on DMRS antenna port 7 and antenna port 9, a DMRS-based transmit diversity scheme, or a random beamforming scheme based on DMRS antenna port 7 and antenna port 8, or if a value of a VRB assignment flag in the DCI format is 0, determine that the transmission scheme of the PDSCH is a single antenna port scheme based on DMRS antenna port 7.

Optionally, the attribute includes a carrier type; and the transmission determining module 82 is specifically configured to:

if the DCI format of the downlink control channel is format 1C, and the carrier for carrying the PDSCH is of a new carrier type, determine that the transmission scheme of the PDSCH is a random beamforming scheme based on DMRS antenna port 7 and antenna port 9 or a DMRS-based transmit diversity scheme.

Optionally, the attribute includes a transmission mode; and the transmission determining module 82 is specifically configured to:

when the DCI format of the downlink control channel is format 1C, if a transmission mode of the carrier for carrying the PDSCH is transmission mode x, determine that the transmission scheme of the PDSCH is a random beamforming scheme based on DMRS antenna port 7 and antenna port 9 or a DMRS-based transmit diversity scheme.

Optionally, the attribute includes a transmission mode; and the transmission determining module 82 is specifically configured to:

when a transmission mode of the carrier for carrying the PDSCH is transmission mode x, where x is an integer greater than 10, if the DCI format of the downlink control channel is format a, determine that the transmission scheme of the PDSCH is a random beamforming scheme based on DMRS antenna port 7 and antenna port 9 or a DMRS-based transmit diversity scheme, where format a is any one DCI format except formats 0, 1, 1A, 1B, 1C, 1D, 2, 2A, 2B, 2C, 2D, 3, 3A, and 4.

Further, the apparatus 800 further includes:

a resource determining module, configured to determine the resource allocation scheme of the PDSCH according to the DCI format of the downlink control channel for scheduling the PDSCH.

Optionally, the resource determining module is specifically configured to:

if the DCI format of the downlink control channel is format a, determine that the resource allocation scheme of the PDSCH is resource allocation type 2 and that a virtual resource block VRB to physical resource block PRB mapping mechanism in any one timeslot is consistent with a VRB to PRB mapping mechanism in an even timeslot in a case of distributed VRBs in LTE Release 11, where format a is any one DCI format except formats 0, 1, 1A, 1B, 1C, 1D, 2, 2A, 2B, 2C, 2D, 3, 3A, and 4.

For specific implementation of this embodiment, reference may be made to the PDSCH transmission method provided by Embodiment 2 of the present invention.

Figure 9:
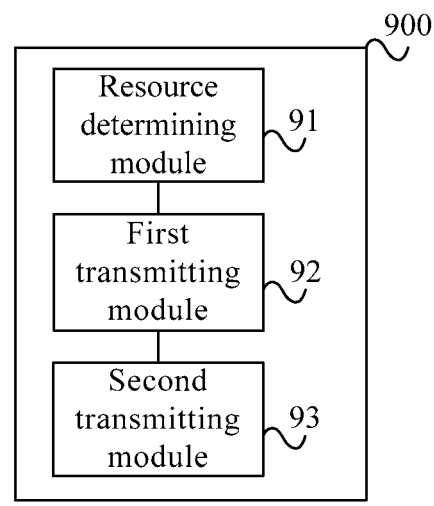
FIG. 9 is a schematic structural diagram of a PDSCH transmission apparatus 900 according to Embodiment 7 of the present invention.

FIG. 9 is a schematic structural diagram of a PDSCH transmission apparatus 900 according to an embodiment of the present invention. As shown in FIG. 9, the apparatus includes:

a resource determining module 91, configured to determine a resource allocation scheme of a PDSCH according to a downlink control information DCI format of a downlink control channel for scheduling the PDSCH and an attribute of a carrier for carrying the PDSCH;

a first transmitting module 92, configured to determine, according to the resource allocation scheme of the PDSCH, DCI carried on the downlink control channel, and transmit, on the downlink control channel, the DCI carried on the downlink control channel; and a second transmitting module 93, configured to transmit, in a physical resource block PRB indicated by the DCI carried on the downlink control channel, the PDSCH according to a transmission scheme of the PDSCH.

Optionally, the attribute includes a carrier type; and the resource determining module 91 is specifically configured to:

if the DCI format of the downlink control channel is format 1A or format 1C, and the carrier for carrying the PDSCH is of a new carrier type, determine that the resource allocation scheme of the PDSCH is resource allocation type 2 and that a virtual resource block VRB to PRB mapping mechanism in any one timeslot is consistent with a VRB to PRB mapping mechanism in an even timeslot in a case of distributed VRBs in Long Term Evolution LTE Release 11.

Optionally, the attribute includes a transmission mode; and the resource determining module 91 is specifically configured to:

if the DCI format of the downlink control channel is format 1A or format 1C, and a transmission mode of the carrier for carrying the PDSCH is transmission mode x, where x is an integer greater than 10, determine that the resource allocation scheme of the PDSCH is resource allocation type 2, and that a VRB to PRB mapping mechanism in any one timeslot is consistent with a VRB to PRB mapping mechanism in an even timeslot in a case of distributed VRBs in LTE Release 11.

Further, the resource determining module 91 is further configured to set a value of a VRB assignment flag in the DCI to 1 if the DCI format of the downlink control channel is format 1A.

Optionally, the attribute includes a carrier type; and the resource determining module 91 is specifically configured to:

if the DCI format of the downlink control channel is a DCI format corresponding to resource allocation type 2, and the carrier for carrying the PDSCH is of a new carrier type, determine that the resource allocation scheme of the PDSCH is resource allocation type 2 and that a VRB to PRB mapping mechanism in any one timeslot is consistent with a VRB to PRB mapping mechanism in an even timeslot in a case of distributed VRBs in LTE Release 11.

Optionally, the attribute includes a transmission mode; and the resource determining module 91 is specifically configured to:

if the DCI format of the downlink control channel is a DCI format corresponding to resource allocation type 2, and a transmission mode of the carrier for carrying the PDSCH is transmission mode x, where x is an integer greater than 10, determine that the resource allocation scheme of the PDSCH is resource allocation type 2 and that a VRB to PRB mapping mechanism in any one timeslot is consistent with a VRB to PRB mapping mechanism in an even timeslot in a case of distributed VRBs in LTE Release 11.

Further, the apparatus 900 further includes:

a first transmission determining module, configured to determine the transmission scheme of the PDSCH according to the DCI format of the downlink control channel for scheduling the PDSCH and the attribute of the carrier for carrying the PDSCH.

Optionally, the attribute includes a carrier type; and the first transmission determining module is specifically configured to:

when the DCI format of the downlink control channel is format 1A or format 1C, if the carrier for carrying the PDSCH is of a new carrier type, determine that the transmission scheme of the PDSCH is a random beamforming scheme based on DMRS antenna port 7 and antenna port 9 or a DMRS-based transmit diversity scheme.

Optionally, the attribute includes a transmission mode; and the first transmission determining module is specifically configured to:

when the DCI format of the downlink control channel is format 1A or format 1C, if a transmission mode of the carrier for carrying the PDSCH is transmission mode x, where x is an integer greater than 10, determine that the transmission scheme of the PDSCH is a random beamforming scheme based on DMRS antenna port 7 and antenna port 9 or a DMRS-based transmit diversity scheme.

Optionally, the attribute includes a transmission mode; and the first transmission determining module is specifically configured to:

when a transmission mode of the carrier for carrying the PDSCH is transmission mode x, where x is an integer greater than 10, if the DCI format of the downlink control channel is format a, determine that the transmission scheme of the PDSCH is a random beamforming scheme based on DMRS antenna port 7 and antenna port 9 or a DMRS-based transmit diversity scheme, or if the DCI format of the downlink control channel is format 1A, determine that the transmission scheme of the PDSCH is a single antenna port scheme based on DMRS antenna port 7, where format a is any one DCI format except formats 0, 1, 1A, 1B, 1C, 1D, 2, 2A, 2B, 2C, 2D, 3, 3A, and 4.

Further, the first transmitting module 92 is specifically configured to:

determine, according to the resource allocation scheme of the PDSCH, resource block allocation information in the DCI carried on the downlink control channel, and determine, according to the transmission scheme of the PDSCH, a value of a VRB assignment flag in the DCI carried on the downlink control channel.

Optionally, the determining, according to the transmission scheme of the PDSCH, a value of a VRB assignment flag in the DCI carried on the downlink control channel includes:

if the transmission scheme of the PDSCH is a random beamforming scheme based on DMRS antenna port 7 and antenna port 9, a DMRS-based transmit diversity scheme, or a random beamforming scheme based on DMRS antenna port 7 and antenna port 8, setting the value of the VRB assignment flag in the DCI to 1; or if the transmission scheme of the PDSCH is a single antenna port scheme based on DMRS antenna port 7, setting the value of the VRB assignment flag in the DCI to 0.

Further, the apparatus 900 further includes:

a second transmission determining module, configured to determine the transmission scheme of the PDSCH according to the DCI format of the downlink control channel for scheduling the PDSCH.

Optionally, the second transmission determining module is specifically configured to:

if the DCI format of the downlink control channel is new DCI format a, determine that the transmission scheme of the PDSCH is a random beamforming scheme based on DMRS antenna port 7 and antenna port 9 or a DMRS-based transmit diversity scheme, where format a is any one DCI format except formats 0, 1, 1A, 1B, 1C, 1D, 2, 2A, 2B, 2C, 2D, 3, 3A, and 4; or if the DCI format of the downlink control channel is format 1A, determine that the transmission scheme of the PDSCH is a single antenna port scheme based on DMRS antenna port 7.

For specific implementation of this embodiment, reference may be made to the PDSCH transmission method provided by Embodiment 3 of the present invention.

Figure 10:
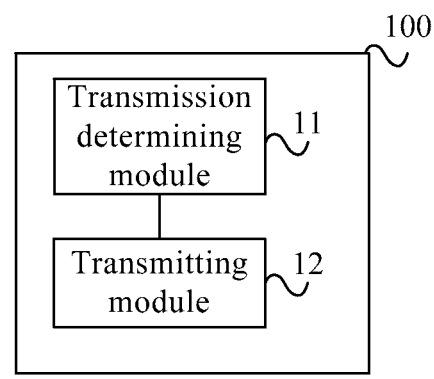
FIG. 10 is a schematic structural diagram of a PDSCH transmission apparatus 100 according to Embodiment 8 of the present invention.

FIG. 10 is a schematic structural diagram of a PDSCH transmission apparatus 100 according to an embodiment of the present invention. As shown in FIG. 10, the apparatus includes:

a transmission determining module 11, configured to determine a transmission scheme of a PDSCH according to an attribute of a carrier for carrying the PDSCH; and a transmitting module 12, configured to transmit, in a physical resource block PRB indicated by downlink control information DCI on a downlink control channel for scheduling the PDSCH, the PDSCH according to the transmission scheme of the PDSCH.

Optionally, the attribute includes a carrier type; and the transmission determining module 11 is specifically configured to:

when the carrier for carrying the PDSCH is of a new carrier type, if a subframe for carrying the PDSCH is a first subframe, determine that the transmission scheme of the PDSCH is a single antenna port scheme based on DMRS antenna port 7; or if a subframe for carrying the PDSCH is a second subframe, determine that the transmission scheme of the PDSCH is a DMRS-based transmit diversity scheme.

Specifically, the first subframe is a subframe carrying a first signal, and the second subframe is a subframe not carrying the first signal, where the first signal includes one or more of a CSI-RS, a CRS, a PSS, an SSS, a DRS, and a broadcast channel; or the second subframe is a subframe for transmitting only the PDSCH and a DMRS, and the first subframe is any other subframe than the second subframe; or the first subframe is an MBSFN subframe, and the second subframe is a non-MBSFN subframe.

Optionally, the attribute includes a carrier type; and the transmission determining module 11 is specifically configured to:

when the carrier for carrying the PDSCH is of a new carrier type, if a bandwidth for carrying the PDSCH completely or partly overlaps a bandwidth for carrying a first signal, determine that the transmission scheme of the PDSCH is a single antenna port scheme based on DMRS antenna port 7, or otherwise, determine that the transmission scheme of the PDSCH is a DMRS-based transmit diversity scheme, where the first signal includes one or more of a CSI-RS, a CRS, a PSS, an SSS, a DRS, and a broadcast channel.

Optionally, the transmission determining module 11 is specifically configured to:

determine the transmission scheme of the PDSCH according to a DCI format of the downlink control channel for scheduling the PDSCH and the attribute of the carrier for carrying the PDSCH.

Optionally, the attribute includes a carrier type; and the transmission determining module 11 is specifically configured to:

when the DCI format of the downlink control channel is format 1A or format 1C, if the carrier for carrying the PDSCH is of a new carrier type, determine that the transmission scheme of the PDSCH is a random beamforming scheme based on DMRS antenna port 7 and antenna port 9 or a DMRS-based transmit diversity scheme.

Optionally, the attribute includes a transmission mode; and the transmission determining module 11 is specifically configured to:

when the DCI format of the downlink control channel is format 1A or format 1C, if a transmission mode of the carrier for carrying the PDSCH is transmission mode x, where x is an integer greater than 10, determine that the transmission scheme of the PDSCH is a random beamforming scheme based on DMRS antenna port 7 and antenna port 9 or a DMRS-based transmit diversity scheme.

Optionally, the attribute includes a transmission mode; and the transmission determining module 11 is specifically configured to:

when a transmission mode configured for the carrier for carrying the PDSCH is transmission mode x, where x is an integer greater than or equal to 10, if the DCI format of the downlink control channel is format a, determine that the transmission scheme of the PDSCH is a random beamforming scheme based on DMRS antenna port 7 and antenna port 9 or a DMRS-based transmit diversity scheme, or if the DCI format of the downlink control channel is format 1A, determine that the transmission scheme of the PDSCH is a single antenna port scheme based on DMRS antenna port 7, where format a is any one DCI format except formats 0, 1, 1A, 1B, 1C, 1D, 2, 2A, 2B, 2C, 2D, 3, 3A, and 4.

Further, the apparatus 100 further includes:

a DCI determining module, configured to determine, according to a resource allocation scheme of the PDSCH, resource block allocation information in the DCI carried on the downlink control channel, and determine, according to the transmission scheme of the PDSCH, a value of a VRB assignment flag in the DCI carried on the downlink control channel.

Optionally, the DCI determining module is specifically configured to:

if the transmission scheme of the PDSCH is a random beamforming scheme based on DMRS antenna port 7 and antenna port 9, a DMRS-based transmit diversity scheme, or a random beamforming scheme based on DMRS antenna port 7 and antenna port 8, set the value of the VRB assignment flag in the DCI to 1; or if the transmission scheme of the PDSCH is a single antenna port scheme based on DMRS antenna port 7, set the value of the VRB assignment flag in the DCI to 0.

Further, the apparatus 100 further includes:

a resource determining module, configured to determine the resource allocation scheme of the PDSCH according to the DCI format of the downlink control channel for scheduling the PDSCH.

Optionally, the resource determining module is specifically configured to:

if the DCI format of the downlink control channel is format a, determine that the resource allocation scheme of the PDSCH is resource allocation type 2 and that a VRB to PRB mapping mechanism in any one timeslot is consistent with a VRB to PRB mapping mechanism in an even timeslot in a case of distributed VRBs in Long Term Evolution LTE Release 11, where format a is any one DCI format except formats 0, 1, 1A, 1B, 1C, 1D, 2, 2A, 2B, 2C, 2D, 3, 3A, and 4.

For specific implementation of this embodiment, reference may be made to the PDSCH transmission method provided by Embodiment 4 of the present invention.

Figure 11:
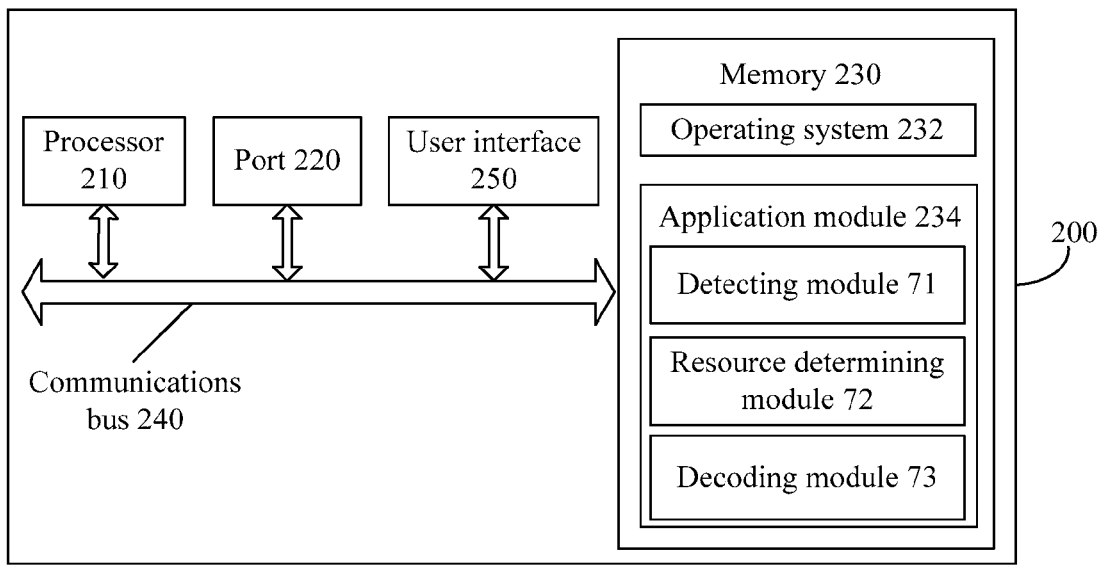
FIG. 11 is a schematic structural diagram of a UE 200 according to Embodiment 9 of the present invention.

FIG. 11 is a schematic structural diagram of a UE 200 according to Embodiment 9 of the present invention. As shown in FIG. 11, generally the UE 200 includes at least one processor 210, for example, a central processing unit (Central Processing Unit, CPU for short) or a digital signal processor (Digital Signal Processor, DSP for short), at least one port 220, a memory 230, and at least one communications bus 240. The communications bus 240 is configured to implement connection and communication between the apparatuses. The processor 210 is configured to execute an executable module stored in the memory 230, for example, a computer program. Optionally, the UE 200 may include a user interface 250, where the user interface 250 includes but is not limited to a display, a keyboard, and a pointing device, for example, a mouse, a trackball (trackball), a touchpad, or a touchscreen. The memory 230 may include a random access memory (Random Access Memory, RAM for short), or may further include a non-volatile memory (non-volatile memory), for example, at least one disk storage.

In some implementation manners, the memory 230 stores the following elements: an executable module or a data structure, or a subset thereof, or an extended set thereof:

an operating system 232, including various system programs, and configured to implement various basic services and process hardware-based tasks; and an application module 234, including various application programs, and configured to implement various application services.

The application module 234 includes but is not limited to a detecting module 71, a resource determining module 72, and a decoding module 73. Further, the application module 234 may further include a first transmission determining module and a second transmission determining module. For specific implementation of each module in the application module 234, reference may be made to the corresponding module in the PDSCH transmission apparatus 700, and no further description is provided herein.

Figure 12:
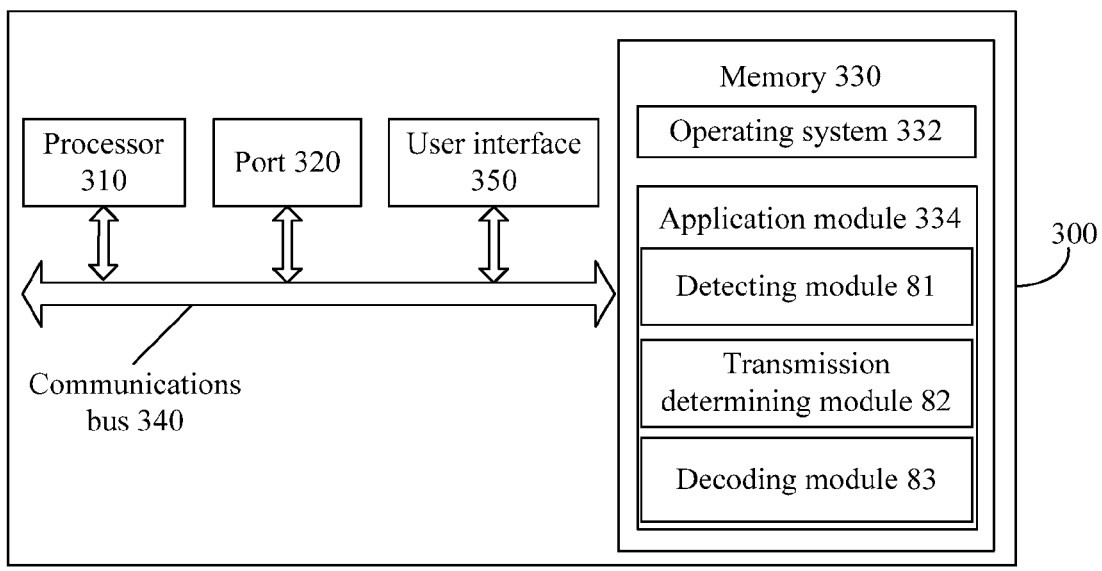
FIG. 12 is a schematic structural diagram of a UE 300 according to Embodiment 10 of the present invention.

FIG. 12 is a schematic structural diagram of a UE 300 according to Embodiment 10 of the present invention. As shown in FIG. 12, generally the UE 300 includes at least one processor 310, for example, a CPU or a DSP, at least one port 320, a memory 330, and at least one communications bus 340. The communications bus 340 is configured to implement connection and communication between the apparatuses. The processor 310 is configured to execute an executable module stored in the memory 330, for example, a computer program. Optionally, the UE 300 may include a user interface 350, where the user interface 350 includes but is not limited to a display, a keyboard, and a pointing device, for example, a mouse, a trackball (trackball), a touchpad, or a touchscreen. The memory 330 may include a RAM, or may further include a non-volatile memory (non-volatile memory), for example, at least one disk storage.

In some implementation manners, the memory 330 stores the following elements: an executable module or a data structure, or a subset thereof, or an extended set thereof:

an operating system 332, including various system programs, and configured to implement various basic services and process hardware-based tasks; and an application module 334, including various application programs, and configured to implement various application services.

The application module 334 includes but is not limited to a detecting module 81, a transmission determining module 82, and a decoding module 83. Further, the application module 334 may further include a resource determining module. For specific implementation of each module in the application module 334, reference may be made to the corresponding module in the PDSCH transmission apparatus 800, and no further description is provided herein.

Figure 13:
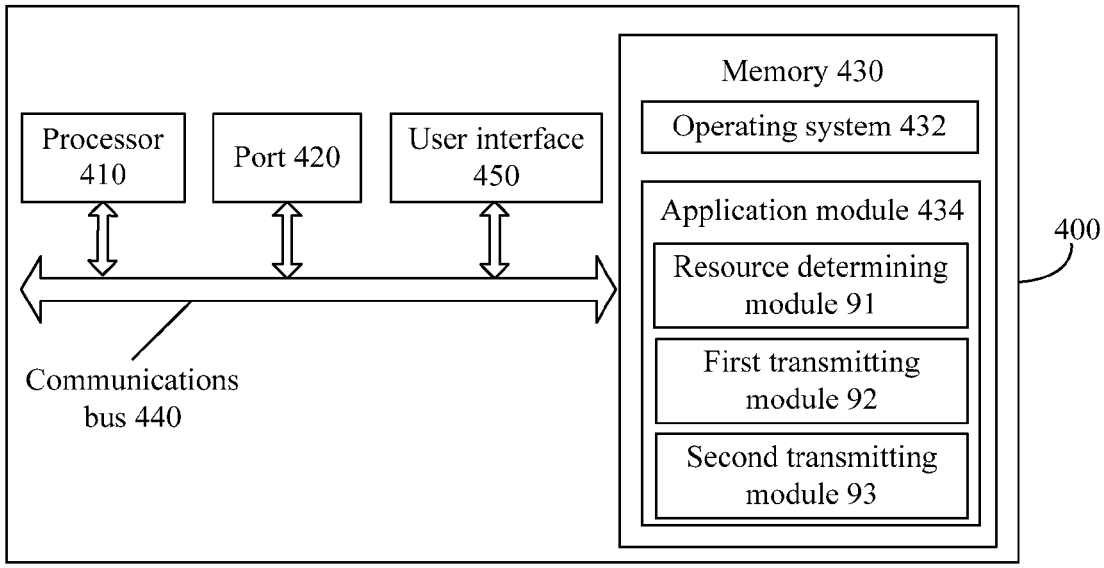
FIG. 13 is a schematic structural diagram of a eNodeB 400 according to Embodiment 11 of the present invention.

FIG. 13 is a schematic structural diagram of a eNodeB 400 according to Embodiment 11 of the present invention. As shown in FIG. 13, generally the eNodeB 400 includes at least one processor 410, for example, a CPU or a DSP, at least one port 420, a memory 430, and at least one communications bus 440. The communications bus 440 is configured to implement connection and communication between the apparatuses. The processor 410 is configured to execute an executable module stored in the memory 430, for example, a computer program. Optionally, the eNodeB 400 may include a user interface 450, where the user interface 450 includes but is not limited to a display, a keyboard, and a pointing device, for example, a mouse, a trackball (trackball), a touchpad, or a touchscreen. The memory 430 may include a RAM, or may further include a non-volatile memory (non-volatile memory), for example, at least one disk storage.

In some implementation manners, the memory 430 stores the following elements: an executable module or a data structure, or a subset thereof, or an extended set thereof:

an operating system 432, including various system programs, and configured to implement various basic services and process hardware-based tasks; and an application module 434, including various application programs, and configured to implement various application services.

The application module 434 includes but is not limited to a resource determining module 91, a first transmitting module 92, and a second transmitting module 93. Further, the application module 434 may further include a first transmission determining module and a second transmission determining module. For specific implementation of each module in the application module 434, reference may be made to the corresponding module in the PDSCH transmission apparatus 900, and no further description is provided herein.

Figure 14:
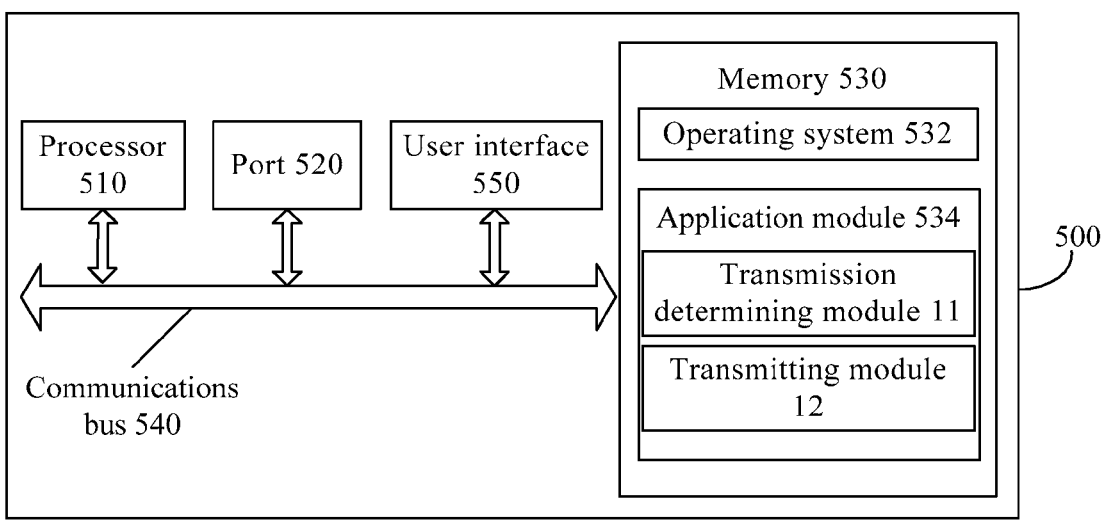
FIG. 14 is a schematic structural diagram of a eNodeB 500 according to Embodiment 12 of the present invention.

FIG. 14 is a schematic structural diagram of a eNodeB 500 according to Embodiment 12 of the present invention. As shown in FIG. 14, generally the eNodeB 500 includes at least one processor 510, for example, a CPU or a DSP, at least one port 520, a memory 530, and at least one communications bus 540. The communications bus 540 is configured to implement connection and communication between the apparatuses. The processor 510 is configured to execute an executable module stored in the memory 530, for example, a computer program. Optionally, the eNodeB 500 may include a user interface 550, where the user interface 550 includes but is not limited to a display, a keyboard, and a pointing device, for example, a mouse, a trackball (trackball), a touchpad, or a touchscreen. The memory 530 may include a RAM, or may further include a non-volatile memory (non-volatile memory), for example, at least one disk storage.

In some implementation manners, the memory 530 stores the following elements: an executable module or a data structure, or a subset thereof, or an extended set thereof:

an operating system 532, including various system programs, and configured to implement various basic services and process hardware-based tasks; and an application module 534, including various application programs, and configured to implement various application services.

The application module 534 includes but is not limited to a transmission determining module 11 and a transmitting module 12. Further, the application module 534 may further include a DCI determining module and a resource determining module. For specific implementation of each module in the application module 534, reference may be made to the corresponding module in the PDSCH transmission apparatus 100, and no further description is provided herein.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A physical downlink shared channel (PDSCH) transmission method, comprising:
   detecting a downlink control channel for scheduling the PDSCH;
   determining a resource allocation scheme of the PDSCH according to a downlink control information (DCI) format of the downlink control channel for scheduling the PDSCH and an attribute of a carrier for carrying the PDSCH; and
   decoding the PDSCH according to the resource allocation scheme of the PDSCH and a transmission scheme of the PDSCH,
   wherein the attribute comprises a carrier type; and the determining the resource allocation scheme of the PDSCH according to the DCI format of the downlink control channel for scheduling the PDSCH and the attribute of the carrier for carrying the PDSCH comprises:
   if the DCI format of the downlink control channel is format 1A, and the carrier for carrying the PDSCH is of a new carrier type, and a value of a virtual resource block VRB assignment flag in the DCI format is 1, determining that the resource allocation scheme of the PDSCH is resource allocation type 2 and that a VRB to physical resource block PRB mapping mechanism in any one timeslot is consistent with a VRB to PRB mapping mechanism in an even timeslot in a case of distributed VRBs in Long Term Evolution (LTE) Release 11.

2. A physical downlink shared channel (PDSCH) transmission method, comprising:
   detecting a downlink control channel for scheduling the PDSCH;
   determining a resource allocation scheme of the PDSCH according to a downlink control information (DCI) format of the downlink control channel for scheduling the PDSCH and an attribute of a carrier for carrying the PDSCH; and
   decoding the PDSCH according to the resource allocation scheme of the PDSCH and a transmission scheme of the PDSCH,
   wherein the attribute comprises a carrier type; and the determining the resource allocation scheme of the PDSCH according to the DCI format of the downlink control channel for scheduling the PDSCH and the attribute of the carrier for carrying the PDSCH comprises:
   if the DCI format of the downlink control channel is format 1A, and the carrier for carrying the PDSCH is a backward-compatible carrier, and a value of a VRB assignment flag in the DCI format is 1, determining that the resource allocation scheme of the PDSCH is a first resource allocation scheme; or
   if the DCI format of the downlink control channel is format 1A, and the carrier for carrying the PDSCH is of a new carrier type, and a value of a VRB assignment flag in the DCI format is 1, determining that the resource allocation scheme of the PDSCH is a second resource allocation scheme; and
   wherein the first resource allocation scheme is a resource allocation scheme corresponding to distributed VRBs in resource allocation type 2 in LTE Release 11, and VRB to PRB mapping mechanisms of the second resource allocation scheme and the first resource allocation scheme are not exactly the same.

3. The method according to claim 2, wherein the second resource allocation scheme is resource allocation type 2, and a VRB to PRB mapping mechanism in any one timeslot is consistent with a VRB to PRB mapping mechanism in an even timeslot in a case of distributed VRBs in LTE Release 11.

4. The method according to claim 1, wherein the attribute comprises a transmission mode; and the determining the resource allocation scheme of the PDSCH according to the DCI format of the downlink control channel for scheduling the PDSCH and the attribute of the carrier for carrying the PDSCH comprises:
   if the DCI format of the downlink control channel is format 1A, and a value of a VRB assignment flag in the DCI format is 1, and a transmission mode of the carrier for carrying the PDSCH is transmission mode x, wherein x is an integer greater than 10, determining that the resource allocation scheme of the PDSCH is resource allocation type 2, and that a VRB to PRB mapping mechanism in any one timeslot is consistent with a VRB to PRB mapping mechanism in an even timeslot in a case of distributed VRBs in LTE Release 11.

5. A PDSCH transmission apparatus, comprising:
   a processor; and
   a memory storing instructions that when executed by the processor configure the processor to:
   detect a downlink control channel for scheduling a physical downlink shared channel (PDSCH);
   determine a resource allocation scheme of the PDSCH according to a downlink control information DCI format of the downlink control channel for scheduling the PDSCH and an attribute of a carrier for carrying the PDSCH; and decode the PDSCH according to the resource allocation scheme of the PDSCH and a transmission scheme of the PDSCH, wherein when the attribute comprises a carrier type, and if the DCI format of the downlink control channel is format 1A and the carrier for carrying the PDSCH is of a new carrier type, and a value of a virtual resource block VRB assignment flag in the DCI format is 1, the processor is further configured to determine that the resource allocation scheme of the PDSCH is resource allocation type 2 and that a VRB to physical resource block PRB mapping mechanism in any one timeslot is consistent with a VRB to PRB mapping mechanism in an even timeslot in a case of distributed VRBs in Long Term Evolution (LTE) Release 11.

6. A PDSCH transmission apparatus, comprising:

a processor; and a memory storing instructions that when executed by the processor configure the processor to:

detect a downlink control channel for scheduling a physical downlink shared channel (PDSCH);

determine a resource allocation scheme of the PDSCH according to a downlink control information DCI format of the downlink control channel for scheduling the PDSCH and an attribute of a carrier for carrying the PDSCH; and decode the PDSCH according to the resource allocation scheme of the PDSCH and a transmission scheme of the PDSCH, wherein when the attribute comprises a carrier type, if the DCI format of the downlink control channel is format 1A, and the carrier for carrying the PDSCH is a backward-compatible carrier, and a value of a VRB assignment flag in the DCI format is 1 the processor is further configured to determine that the resource allocation scheme of the PDSCH is a first resource allocation scheme; or wherein when the attribute comprises a carrier type, if the DCI format of the downlink control channel is format 1A, and the carrier for carrying the PDSCH is of a new carrier type, and a value of a VRB assignment flag in the DCI format is 1, the processor is further configured to determine that the resource allocation scheme of the PDSCH is a second resource allocation scheme; and wherein the first resource allocation scheme is a resource allocation scheme corresponding to distributed VRBs in resource allocation type 2 in LTE Release 11, and VRB to PRB mapping mechanisms of the second resource allocation scheme and the first resource allocation scheme are not exactly the same.

7. The apparatus according to claim 6, wherein the second resource allocation scheme is resource allocation type 2, and a VRB to PRB mapping mechanism in any one timeslot is consistent with a VRB to PRB mapping mechanism in an even timeslot in a case of distributed VRBs in LTE Release 11.

* * * * *

UNITED STATES PATENT AND TRADEMARK OFFICE
CERTIFICATE OF CORRECTION

PATENT NO. : 10,004,063 B2  
APPLICATION NO. : 14/802938  
DATED : June 19, 2018  
INVENTOR(S) : Cheng et al.

Page 1 of 1

It is certified that error appears in the above-identified patent and that said Letters Patent is hereby corrected as shown below:

On the Title Page

Page 2, Item (56), References Cited, Foreign Patent Documents, "WO WO 2010124721 A1," should read -- WO 2010124721 A1 --.

Page 2, Item (56), References Cited, Foreign Patent Documents, "WO WO 2012175057 A1," should read -- WO 2012175057 A1 --.

In the Claims

Column 61, Line 6, Claim 5 "format 1A and" should read -- format 1A, and --.

Column 62, Line 5, Claim 6 "the DCI format is 1 the processor" should read -- the DCI format is 1, the processor --.

Signed and Sealed this  
Eleventh Day of September, 2018

Andrei Iancu  
*Director of the United States Patent and Trademark Office*